(12) United States Patent
Saha et al.

(10) Patent No.: US 10,351,002 B2
(45) Date of Patent: Jul. 16, 2019

(54) INVERTER CONTROL DEVICE AND VEHICLE CONTROL DEVICE

(71) Applicant: AISIN AW CO., LTD., Anjo-shi, Aichi-ken (JP)

(72) Inventors: Subrata Saha, Anjo (JP); Takashi Yoshida, Nishio (JP); Yuki Sugiyama, Nishio (JP); Yoichi Tajima, Anjo (JP); Masaya Kokubo, Anjo (JP)

(73) Assignee: AISIN AW CO., LTD., Anjo (JP)

(*) Notice: Subject to any disclaimer, the term of this patent is extended or adjusted under 35 U.S.C. 154(b) by 96 days.

(21) Appl. No.: 15/517,753

(22) PCT Filed: Nov. 13, 2015

(86) PCT No.: PCT/JP2015/082037
§ 371 (c)(1),
(2) Date: Apr. 7, 2017

(87) PCT Pub. No.: WO2016/076429
PCT Pub. Date: May 19, 2016

(65) Prior Publication Data
US 2017/0305274 A1    Oct. 26, 2017

(30) Foreign Application Priority Data

Nov. 14, 2014 (JP) ................... 2014-231909
Nov. 14, 2014 (JP) ................... 2014-231910
Nov. 14, 2014 (JP) ................... 2014-231911

(51) Int. Cl.
*B60L 3/00* (2019.01)
*B60L 3/04* (2006.01)
(Continued)

(52) U.S. Cl.
CPC ............. *B60L 3/003* (2013.01); *B60L 3/0061* (2013.01); *B60L 3/04* (2013.01); *B60L 50/51* (2019.02);
(Continued)

(58) Field of Classification Search
CPC ........ B60L 3/003; B60L 50/51; B60L 3/0061; B60L 3/04; H02H 7/1227; H02H 7/18;
(Continued)

(56) References Cited

U.S. PATENT DOCUMENTS 3,774,095 A     11/1973  Coccia
8,410,745 B2 *   4/2013  Hosoda ................... B60L 3/003
                                                    318/801
(Continued)

FOREIGN PATENT DOCUMENTS

JP  2002-017098 A   1/2002
JP  2003-134797 A   5/2003
(Continued)

OTHER PUBLICATIONS

Jan. 26, 2016 International Search Report issued in International Patent Application No. PCT/JP2015/082037.

*Primary Examiner* — Eduardo Colon Santana
*Assistant Examiner* — Devon A Joseph
(74) *Attorney, Agent, or Firm* — Oliff PLC

(57) ABSTRACT

An inverter control device that controls a rotary electric machine drive device that includes an inverter with a plurality of switching elements, where the active short circuit control is executed in a high rotational speed region, and the shut-down control is executed in a low rotational speed region, which is on a low rotational speed side with respect to the high rotational speed region, in accordance with at least a rotational speed of the rotary electric machine.

20 Claims, 14 Drawing Sheets

(51) Int. Cl.
*H02H 7/18* (2006.01)
*H02P 3/24* (2006.01)
*B60L 50/51* (2019.01)
*H02H 7/122* (2006.01)
*H02P 27/06* (2006.01)
*H02P 27/08* (2006.01)
*H02P 29/024* (2016.01)

(52) U.S. Cl.
CPC ............ *H02H 7/1227* (2013.01); *H02H 7/18* (2013.01); *H02P 3/24* (2013.01); *H02P 27/06* (2013.01); *H02P 27/08* (2013.01); *H02P 29/027* (2013.01)

(58) Field of Classification Search
CPC .. H02P 3/24; H02P 27/06; H02P 27/08; H02P 29/027
USPC ......................................................... 318/373
See application file for complete search history.

(56) References Cited

U.S. PATENT DOCUMENTS

| | | | | |
|---|---|---|---|---|
| 9,344,019 | B2* | 5/2016 | Furukawa | B62D 5/0403 |
| 2009/0096394 | A1* | 4/2009 | Taniguchi | H02M 1/32 |
| | | | | 318/400.09 |
| 2010/0036555 | A1* | 2/2010 | Hosoda | B60L 3/003 |
| | | | | 701/22 |
| 2013/0234446 | A1* | 9/2013 | Kishibata | G05B 19/00 |
| | | | | 290/38 R |
| 2014/0368142 | A1* | 12/2014 | Uchida | H02P 6/06 |
| | | | | 318/400.21 |
| 2017/0113678 | A1* | 4/2017 | Oba | B60K 6/26 |
| 2017/0331400 | A1* | 11/2017 | Saha | H02P 27/06 |

FOREIGN PATENT DOCUMENTS

| | | |
|---|---|---|
| JP | 2009-201333 A | 9/2009 |
| JP | 2012-50333 A | 3/2012 |

* cited by examiner

INVERTER CONTROL DEVICE AND VEHICLE CONTROL DEVICE

BACKGROUND

The present disclosure relates to an inverter control device that controls a rotary electric machine drive device that includes an inverter, and to a vehicle control device that includes the inverter control device.

An inverter that performs electric power conversion between DC power and AC power is interposed between an AC rotary electric machine and a DC power source in many cases. The rotary electric machine not only functions as a motor that outputs power using electrical energy, but also functions as an electric generator that generates electric power using kinetic energy of a wheel, an internal combustion engine, etc. Electric power generated by the rotary electric machine is regenerated and stored in the DC power source. A power source switch such as a contactor is occasionally provided between the DC power source and the inverter. When the power source switch is in an on state, the power source switch is in a conductive state, so that the DC power source and the inverter and the rotary electric machine are electrically connected to each other. When the power source switch is in an off state, the power source switch is in a non-conductive state, so that the electrical connection between the DC power source and the inverter and the rotary electric machine is blocked.

When a failure such as an overcurrent and an overvoltage has occurred in the inverter of the rotary electric machine, shut-down control is performed, for example. In the shut-down control, a switching control signal for switching elements that constitute the inverter is varied into a non-active state to bring the inverter into an off state. Japanese Patent Application Publication No. 2003-134797, for example, discloses an example in which shut-down control is performed on the basis of the result of detection by an abnormality detection circuit or an overcurrent detection circuit in an IPM (Intelligent Power Module) in which a plurality of switching elements are integrated with each other to constitute an inverter (FIG. 1 etc.).

In this way, the shut-down control is occasionally used as a scheme for fail-safe within a rated operation range of the rotary electric machine. It is known that as the rotational speed of the rotary electric machine is higher, the counter electromotive force is larger. Thus, in general, the allowable counter electromotive force and the rotational speed of the rotary electric machine corresponding to the counter electromotive force are set in consideration of the lowest value of a DC link voltage (a voltage on the DC side of the inverter) within the rated operation range and the maximum rated voltage of the inverter or the like to which the DC link voltage is applied.

SUMMARY

Depending on the usage of the rotary electric machine, however, the counter electromotive force at the highest rotational speed may have a very high value. A consideration is given to a case where the shut-down control is executed when a failure occurs when the rotary electric machine performs power running at a very high rotational speed, for example. When the shut-down control is executed with the power source switch in an on state, high regenerative torque may be generated, and a large DC power source current for charging the DC power source may flow to damage the DC power source. When the power source switch is brought into an off state in order to protect the DC power source, on the other hand, the DC link voltage is abruptly raised. As a result, the inverter (switching elements), a smoothing capacitor that smoothes the DC link voltage, or the like may be damaged.

An exemplary aspect of the present disclosure appropriately executes fail-safe control while suppressing an excessive increase in DC power source current that flows through a DC power source or DC link voltage in the case where a failure has occurred in a rotary electric machine drive device that includes an inverter.

In view of the foregoing, an inverter control device controls a rotary electric machine drive device that includes an inverter with a plurality of switching elements, the inverter control device including: an electronic control unit that is programmed to perform switching control on the switching elements and to execute fail-safe control when a failure has occurred in the rotary electric machine drive device, wherein: the inverter is connected to a DC power source and connected to an AC rotary electric machine drivably coupled to wheels of a vehicle to perform electric power conversion between DC power and multi-phase AC power, the inverter including a series circuit including an upper switching element and a lower switching element that form an arm for one phase of the AC power, and the inverter including a freewheeling diode connected in parallel with each of the switching elements with a direction from a lower side toward an upper side defined as a forward direction; active short circuit control and shut-down control, in which all the switching elements are brought into an off state, are selectively executed in the fail-safe control, the active short circuit control being either upper-side active short circuit control, in which the upper switching elements of the arms for all the multiple phases are brought into an on state, or lower-side active short circuit control, in which the lower switching elements of the arms for all the multiple phases are brought into an on state; and the active short circuit control is executed in a high rotational speed region, and the shut-down control is executed in a low rotational speed region, which is on a low rotational speed side with respect to the high rotational speed region, in accordance with at least a rotational speed of the rotary electric machine.

The counter electromotive force of the rotary electric machine becomes larger in accordance with the rotational speed of the rotary electric machine. Therefore, in the case where the shut-down control is executed, a DC power source current, which flows through the DC power source for charging, and a DC link voltage, which is a voltage on a DC side of the inverter, tend to be increased in accordance with the rotational speed. Meanwhile, the active short circuit control has constraints that the rotary electric machine occasionally generates large negative torque in the case where the active short circuit control is executed at a low rotational speed and that the rotary electric machine generates a large amount of heat in the case where the active short circuit control is executed for a long time. However, the energy possessed by stator coils of the rotary electric machine does not flow into the DC power source as a current for charging, but is circulated between the stator coils and the inverter. Therefore, in the active short circuit control, the DC link voltage is not raised.

With the present configuration, in the high rotational speed region in which the rotational speed of the rotary electric machine is relatively high, the active short circuit control is selected as the fail-safe control. Thus, an increase in the DC power source current which flows through the DC power source and a rise in the DC link voltage are suppressed. In the low rotational speed region in which the rotational speed of the rotary electric machine is relatively low, on the other hand, the shut-down control is selected as the fail-safe control. Thus, it is possible to suppress generation of large negative torque by the rotary electric machine, and to shorten the period for which the active short circuit control is executed. In the low rotational speed region, in addition, the amount of increase in the DC power source current and the DC link voltage due to the shut-down control is suppressed within an appropriate range. In this way, with the present configuration, it is possible to appropriately execute the fail-safe control while suppressing an excessive increase in the DC power source current for charging the DC power source or the DC link voltage in the case where a failure has occurred in the rotary electric machine drive device which includes the inverter.

In view of the foregoing, an inverter control device controls a rotary electric machine drive device that includes an inverter with a plurality of switching elements, the inverter control device including: an electronic control unit that is programmed to perform switching control on the switching elements and to execute fail-safe control when a failure has occurred in the rotary electric machine drive device, wherein: the inverter is connected to a DC power source and connected to an AC rotary electric machine drivably coupled to wheels of a vehicle to perform electric power conversion between DC power and multi-phase AC power, the inverter including a series circuit including an upper switching element and a lower switching element that form an arm for one phase of the AC power, and the inverter including a freewheeling diode connected in parallel with each of the switching elements with a direction from a lower side toward an upper side defined as a forward direction; at least two modulation control schemes including pulse width modulation control and rectangular-wave control are selectively executed, the pulse width modulation control being a control scheme in which a plurality of pulses with different duties are output in one cycle of electrical angle, and the rectangular-wave control being a control scheme which is performed along with field weakening control, in which regulation is performed in a direction of weakening a field of the rotary electric machine, and in which one pulse is output in one cycle of electrical angle; active short circuit control and shut-down control, in which all the switching elements are brought into an off state, are selectively executed in the fail-safe control, the active short circuit control being either upper-side active short circuit control, in which the upper switching elements of the arms for all the multiple phases are brought into an on state, or lower-side active short circuit control, in which the lower switching elements of the arms for all the multiple phases are brought into an on state; and the active short circuit control is executed when a failure has occurred in the rotary electric machine drive device during execution of the rectangular-wave control, and the shut-down control is executed when a failure has occurred in the rotary electric machine drive device during execution of the pulse width modulation control.

The rectangular-wave control is executed in a region in which the rotational speed of the rotary electric machine is relatively high, and the pulse width modulation control is executed in a region in which the rotational speed of the rotary electric machine is relatively low compared to the rectangular-wave control. With the present configuration, in the case where a failure has occurred in the rotary electric machine drive device during execution of the rectangular-wave control, the active short circuit control is selected as the fail-safe control. Thus, an increase in the DC power source current which flows through the DC power source and a rise in the DC link voltage are suppressed. On the other hand, the shut-down control, which may cause an increase in the DC power source current or a rise in the DC link voltage, is selected in the case where a failure has occurred in the rotary electric machine drive device during execution of the pulse width modulation control. Thus, it is possible to suppress generation of large negative torque by the rotary electric machine, and to shorten the period for which the active short circuit control is executed. During execution of the pulse width modulation control, in addition, the rotational speed of the rotary electric machine is relatively low, and therefore the amount of increase in the DC power source current or the DC link voltage due to the shut-down control is suppressed within an appropriate range. In this way, with the present configuration, it is possible to appropriately execute the fail-safe control while suppressing an excessive increase in the DC power source current for charging the DC power source or the DC link voltage in the case where a failure has occurred in the rotary electric machine drive device which includes the inverter.

BRIEF DESCRIPTION OF THE DRAWINGS

Various exemplary aspects of the disclosure will be described with reference to the drawings, wherein.

DETAILED DESCRIPTION OF EMBODIMENTS

1. First Embodiment

Figure 1:
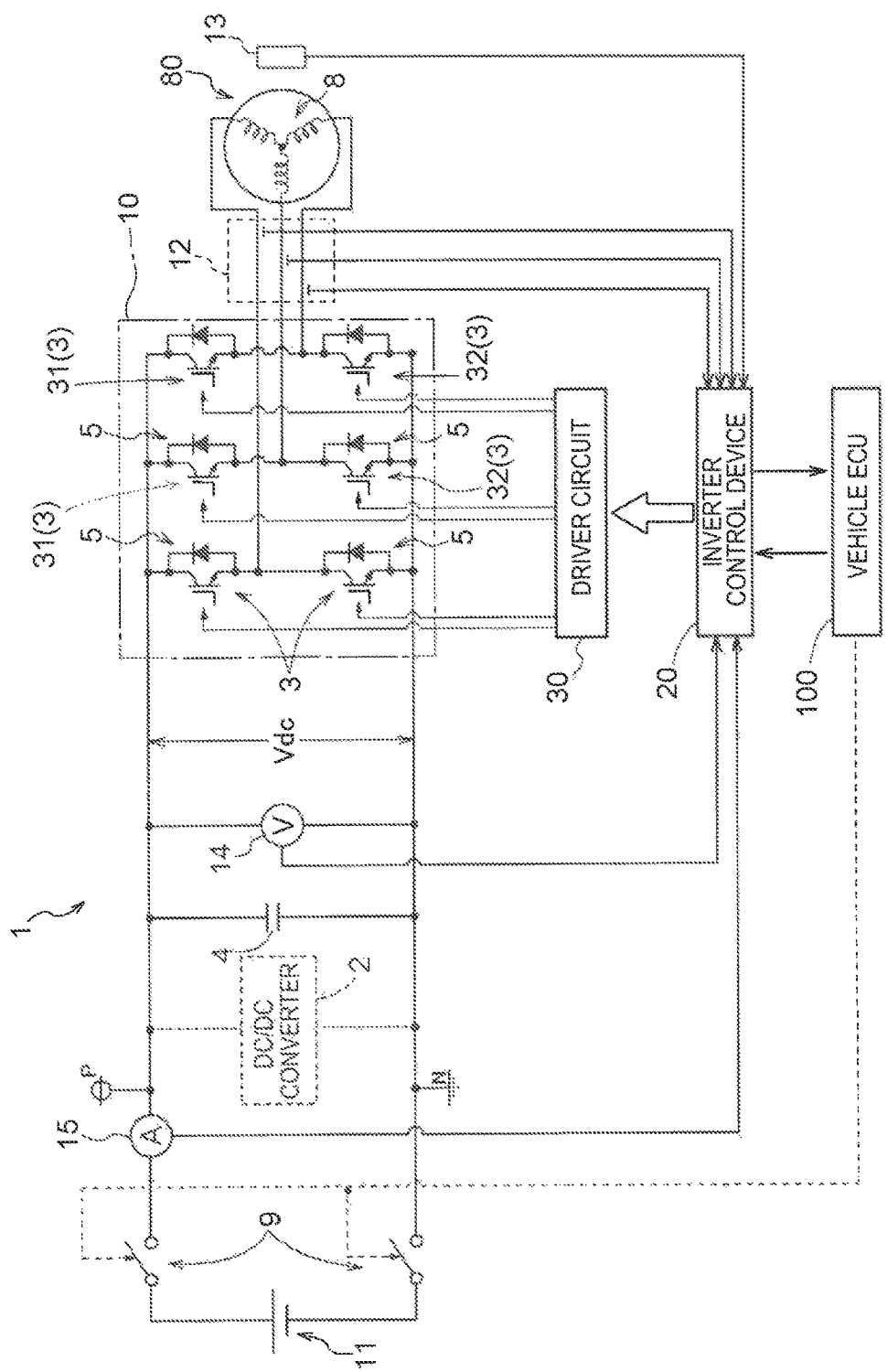
FIG. 1 is a circuit block diagram schematically illustrating the system configuration of a rotary electric machine drive device.

An inverter control device according to a first embodiment will be described with reference to the drawings. As illustrated in FIG. 1, an inverter control device 20 controls a rotary electric machine drive device 1 that includes an inverter 10, and controls drive of a rotary electric machine 80 via the rotary electric machine drive device 1. The inverter control device 20 performs switching control on switching elements 3 that constitute the inverter 10, and executes fail-safe control to be discussed later in the case where a failure has occurred in the rotary electric machine drive device 1.

The inverter 10 is an electric power conversion device connected to a high-voltage battery 11 (DC power source) via a contactor 9 (power source switch) and connected to the AC rotary electric machine 80 to perform electric power conversion between DC power and multi-phase AC power (here, three-phase AC power). In the inverter 10, a series circuit that includes an upper switching element 31 and a lower switching element 32 constitutes an arm for one phase of AC power. A diode 5 (freewheeling diode) is connected in parallel with each of the switching elements 3 with a direction from the lower side toward the upper side defined as a forward direction. The contactor 9 is an example of the power source switch. The power source switch refers to a switch that opens and closes an electrical circuit, and closes (connects) the electrical circuit in an on state and opens (disconnects) the electrical circuit in an off state. The high-voltage battery 11 is an example of the DC power source.

The rotary electric machine 80 to be driven by the rotary electric machine drive device 1 and the inverter control device 20 is a rotary electric machine that serves as a drive force source for the wheels of a vehicle such as a hybrid vehicle and an electric vehicle, for example. In the embodiment, the rotary electric machine 80 is a drive force source for the wheels of such a vehicle. However, the usage of the rotary electric machine 80 is not limited thereto. The rotary electric machine 80 is a rotary electric machine that operates on multi-phase AC power (here, three-phase AC power), and can function as both an electric motor and an electric generator. That is, the rotary electric machine 80 converts electric power from the high-voltage battery 11 into power via the inverter 10 (power running). Alternatively, the rotary electric machine 80 converts a rotational drive force transferred from an internal combustion engine 70 or wheels W to be discussed later with reference to FIG. 2 into electric power to charge the high-voltage battery 11 via the inverter 10 (regeneration).

Figure 2:
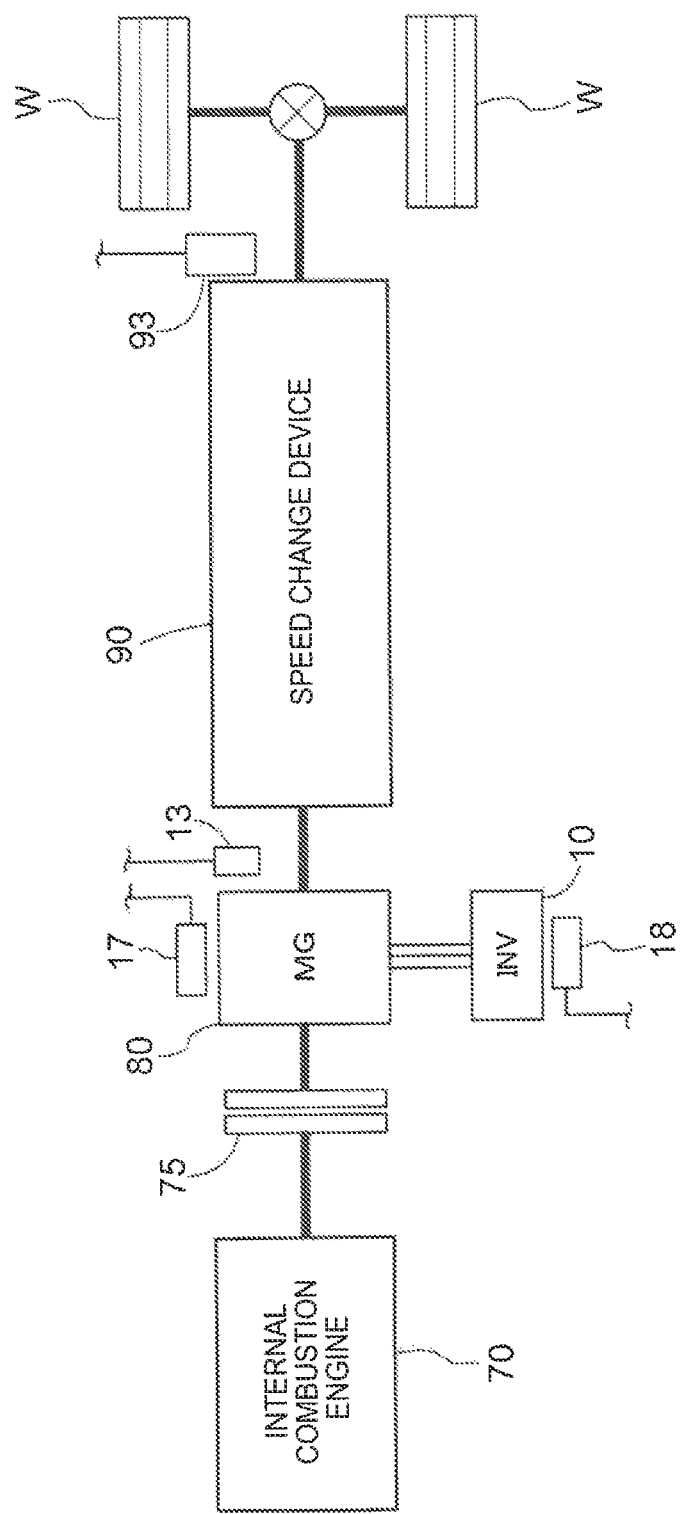
FIG. 2 is a block diagram schematically illustrating the configuration of a drive device for a vehicle.

As illustrated in the schematic diagram of FIG. 2, the rotary electric machine 80 according to the embodiment is a rotary electric machine (MG: Motor/Generator) that serves as a drive force source for a hybrid automobile. In the embodiment, a vehicle that includes a hybrid drive device (vehicle drive device) of a so-called parallel type is described. The hybrid drive device includes an internal combustion engine 70 and the rotary electric machine 80 as drive force sources for the wheels of the vehicle. The internal combustion engine 70 is a heat engine driven by combustion of fuel. For example, various types of known internal combustion engines such as a gasoline engine and a diesel engine may be used as the internal combustion engine 70. The internal combustion engine 70 and the rotary electric machine 80 are drivably coupled to each other via an internal combustion engine cut-off clutch 75.

The hybrid drive device also includes a speed change device 90. The speed change device 90 is a stepped automatic speed change device that provides a plurality of shift speeds with different speed ratios. In order to establish the plurality of shift speeds, the speed change device 90 includes a gear mechanism such as a planetary gear mechanism and a plurality of engagement devices (such as clutches and brakes), for example. An input shaft of the speed change device 90 is drivably coupled to an output shaft (e.g. a rotor shaft) of the rotary electric machine 80. The rotational speed and torque of the internal combustion engine 70 and the rotary electric machine 80 are transferred to the input shaft of the speed change device 90. The speed change device 90 transfers the rotational speed which has been transferred to the speed change device 90 and the torque which has been transferred to the speed change device 90 to an output shaft of the speed change device 90 with the rotational speed changed with the speed ratio of each shift speed and with the torque converted. The output shaft of the speed change device 90 is distributed to two axles via a differential gear (output differential gear device), and transferred to the wheels W which are drivably coupled to the axles, for example. Here, the term "speed ratio" refers to the ratio of the rotational speed of the input shaft to the rotational speed of the output shaft (=the rotational speed of the input shaft/the rotational speed of the output shaft) for a case where each shift speed is established in the speed change device 90. In addition, torque obtained by multiplying the torque which is transferred from the input shaft to the speed change device 90 by the speed ratio corresponds to torque transferred to the output shaft.

The term "drivably coupled" as used herein means a state in which two rotary elements are coupled to each other in such a manner that enables transfer of a drive force. Specifically, the term "drivably coupled" includes a state in which the two rotary elements are coupled so as to rotate together with each other, and a state in which the two rotary elements are coupled in such a way that enables transfer of a drive force via one or two or more transmission members. Examples of such transmission members include various members that transfer rotation at an equal speed or a changed speed, such as a shaft, a gear mechanism, a belt, and a chain. Additional examples of such transmission members include engagement devices that selectively transfer rotation and a drive force, such as a friction engagement device and a meshing-type engagement device. Thus, the rotary electric machine 80 can be considered as being drivably coupled to the wheels W.

In FIG. 2, reference numeral 17 denotes a temperature sensor that detects the temperature of the rotary electric machine 80, and reference numeral 18 denotes a temperature sensor that detects the temperature of the inverter 10 (the temperature of the switching elements 3). The number of such temperature sensors is not limited to one each in the rotary electric machine 80 and the inverter 10, and a plurality of temperature sensors each may be provided in the rotary electric machine 80 and the inverter 10. Sensors based on a variety of principles such as a thermistor, a thermocouple, and a non-contact thermometer (radiation thermometer) can be utilized, as appropriate, as the temperature sensors. Reference numeral 13 denotes a rotation sensor that detects rotation (such as speed, direction, and angular speed) of a rotor of the rotary electric machine 80, and reference numeral 93 denotes a rotation sensor that detects rotation of the output shaft of the speed change device 90. A resolver, an optical encoder, or a magnetic encoder can be utilized, as appropriate, as the rotation sensors. In FIG. 2, a starter device that starts the internal combustion engine 70, various oil pumps (electrical and mechanical), a control device for the speed change device 90, and so forth are not illustrated.

Returning to FIG. 1, the system configuration of the rotary electric machine drive device 1 will be described. The high-voltage battery 11 which serves as an electric power source for driving the rotary electric machine 80 is constituted of a secondary battery (battery) such as a nickel-hydrogen battery or a lithium-ion battery, an electric double layer capacitor, or the like. The high-voltage battery 11 is a DC power source that has a high voltage and a high capacity in order to supply electric power to the rotary electric machine 80. The rated power source voltage of the high-voltage battery 11 is 200 to 400 [V], for example. Because the rotary electric machine 80 is an AC rotary electric machine, the inverter 10 which performs electric power conversion between DC power and AC power (here, three-phase AC power) is provided between the high-voltage battery 11 and the rotary electric machine 80. Hereinafter, the voltage across a positive power source line P and a negative power source line N on the DC side of the inverter 10 will be referred to as a "DC link voltage Vdc". The high-voltage battery 11 can supply electric power to the rotary electric machine 80 via the inverter 10, and can store electric power generated by the rotary electric machine 80.

As indicated by the broken line in FIG. 1, a DC/DC converter 2 that converts a DC voltage may be provided between the high-voltage battery 11 and the inverter 10. The DC/DC converter 2 supplies electric power to accessories such as an air conditioner of the vehicle.

A smoothing capacitor 4 (DC link capacitor) that smoothes the DC link voltage Vdc is provided on the DC side of the inverter 10. The smoothing capacitor 4 stablizes a DC voltage (DC link voltage Vdc) that fluctuates in accordance with fluctuations in electric power consumption of the rotary electric machine 80.

The contactor 9 which serves as a power source switch is provided on the inverter 10 side of the high-voltage battery 11. In the case where the DC/DC converter 2 is not provided, the contactor 9 is disposed between the smoothing capacitor 4 and the high-voltage battery 11. In the case where the DC/DC converter 2 is provided, the contactor 9 is disposed between the DC/DC converter 2 and the high-voltage battery 11. That is, the contactor 9 can block the electrical connection between the electrical circuit system (the DC/DC converter 2, the smoothing capacitor 4, and the inverter 10) of the rotary electric machine drive device 1 and the high-voltage battery 11.

In the embodiment, the contactor 9 is a mechanical relay that opens and closes (turns on and off) on the basis of an instruction from a vehicle ECU (Electronic Control Unit) 100 which is one of the highest-level control devices of the vehicle, and is referred to as a "system main relay (SMR)", for example. The contactor 9 is brought into a conductive state (connected state) with contacts of the SMR closed when an ignition key (IG key) of the vehicle is in an on state (effective state), and brought into a non-conductive state (open state) with the contacts of the SMR open when the IG key is in an off state (ineffective state). The inverter 10 is connected to the rotary electric machine 80, and connected to the high-voltage battery 11 via the contactor 9. When the contactor 9 is in a connected state (on state), the high-voltage battery 11 and the inverter 10 (and the rotary electric machine 80) are electrically connected to each other. When the contactor 9 is in an open state (off state), the electrical connection between the high-voltage battery 11 and the inverter 10 (and the rotary electric machine 80) is blocked.

As discussed above, the inverter 10 converts DC power having the DC link voltage Vdc into AC power with multiple phases (n phases with n being a natural number; here, three phases) to supply the AC power to the rotary electric machine 80, and converts AC power generated by the rotary electric machine 80 into DC power to supply the DC power to the DC power source. The inverter 10 is configured to have a plurality of switching elements 3. The switching elements 3 are preferably power semiconductor elements that can operate at a high frequency, such as IGBTs (Insulated Gate Bipolar Transistors), power MOSFETs (Metal Oxide Semiconductor Field Effect Transistors), SiC-MOSFETs (Silicon Carbide—Metal Oxide Semiconductor FETs), SiC-SITs (SiC—Static Induction Transistors), and GaN-MOSFETs (Gallium Nitride-MOSFETs). In the embodiment, as illustrated in FIG. 1, IGBTs are used as the switching elements 3.

The inverter 10 which performs electric power conversion between DC power and multi-phase AC power, for example, is constituted of a bridge circuit that has a number of arms, the number corresponding to the number of the multiple phases, as is well known. That is, as illustrated in FIG. 1, two switching elements 3 are connected in series between the DC positive side (positive power source line P) and the DC negative side (negative power source line N) of the inverter 10 to constitute one arm. In the case of three-phase AC power, three such series circuits (each corresponding to one arm) are connected in parallel (to form three phases). That is, a bridge circuit is constituted in which each series circuit (arm) is associated with a corresponding one of stator coils 8 of the rotary electric machine 80 that correspond to U-phase, V-phase, and W-phase.

The middle point in each series circuit (arm) formed by a pair of switching elements 3 for each phase, that is, the point of connection between the switching element 3 on the positive power source line P side (upper switching element 31) and the switching element 3 on the negative power source line N side (lower switching element 32), is connected to each of the stator coils 8 of the rotary electric machine 80 for three phases. The diode 5 is provided in parallel with each of the switching elements 3 with the direction from the negative pole "N" toward the positive pole "P" (the direction from the lower side toward the upper side) defined as the forward direction.

As illustrated in FIG. 1, the inverter 10 is controlled by the inverter control device 20. The inverter control device 20 is constructed of a logic circuit such as a microcomputer as a core member. For example, the inverter control device 20 controls the rotary electric machine 80 via the inverter 10 by performing current feedback control using a vector control method on the basis of target torque TM for the rotary electric machine 80 provided as a request signal from another control device or the like such as the vehicle ECU 100 via a CAN (Controller Area Network) or the like. Actual currents that flow through the stator coils 8 of the rotary electric machine 80 for the respective phases are detected by a current sensor 12, and the inverter control device 20 acquires the detection result. In addition, the magnetic pole position of the rotor of the rotary electric machine 80 at each time point is detected by the rotation sensor 13 such as a resolver, for example, and the inverter control device 20 acquires the detection result. The inverter control device 20 executes current feedback control using the detection result of the current sensor 12 and the rotation sensor 13. The inverter control device 20 is configured to have a variety of functional sections for the current feedback control, which are each implemented through cooperation between hardware such as a microcomputer and software (program). The current feedback control is known, and thus is not described in detail herein.

Control terminals of the switching elements 3 (e.g. gate terminals of the IGBTs) which constitute the inverter 10 are connected to the inverter control device 20 via a driver circuit 30 to be individually subjected to switching control. The vehicle ECU 100 and the inverter control device 20 which generates a switching control signal are constituted of a microcomputer or the like as a core component, and have an operating voltage (a power source voltage for the circuit) that is significantly different from that of a high voltage-system circuit that drives the rotary electric machine 80. Many vehicles include not only the high-voltage battery 11 but also a low-voltage battery (not illustrated) that serves as a power source at a low voltage (e.g. 12 to 24 [V]) compared to the high-voltage battery 11. The operating voltage of the vehicle ECU 100 and the inverter control device 20 is 5 [V] or 3.3 [V], for example, and the vehicle ECU 100 and the inverter control device 20 are supplied with electric power from the low-voltage battery to operate.

The low-voltage battery and the high-voltage battery 11 are isolated from each other, and floated from each other. Therefore, the rotary electric machine drive device 1 is provided with the driver circuit 30 (control signal drive circuit) which relays a switching control signal (e.g. a gate drive signal) for each of the switching elements 3 with the drive capability (e.g. the capability to cause the following circuit to operate, such as the voltage amplitude and the output current) of the switching control signal enhanced. A switching control signal generated by the inverter control device 20 which is a low voltage-system circuit is supplied to the inverter 10 as a switching control signal for the high voltage-system circuit via the driver circuit 30. The low voltage-system circuit and the high voltage-system circuit are isolated from each other. Therefore, the driver circuit 30 is constituted using an insulating element such as a photo-coupler and a transformer and a driver IC, for example.

The inverter control device 20 according to the embodiment determines that a failure has occurred in the rotary electric machine drive device 1 in the case where at least the contactor 9 is brought into an off state, and performs the fail-safe control in order to restrict operation of the rotary electric machine 80. In addition, the inverter control device 20 also determines that a failure has occurred in the rotary electric machine drive device 1 in the case where any failure has occurred in the vehicle, the rotary electric machine 80, the speed change device 90, the inverter 10, or the like, and performs the fail-safe control. The fail-safe control is executed by the inverter control device 20 as a core component. The inverter control device 20 executes the fail-safe control not only in the case where the inverter control device 20 directly acquires failure detection information, but also in response to a fail-safe control request from another control device such as the vehicle ECU 100. Here, examples of the "failure" of the rotary electric machine drive device 1 include various failures that affect operation of the rotary electric machine drive device 1, such as generation of an overvoltage due to the contactor 9 being brought into an off state, an abnormal detected current value due to a failure of the current sensor in the inverter 10, generation of an overcurrent due to a wire breakage in a circuit in the inverter 10, a failure of the inverter control device 20 or the driver circuit 30, blockage of communication between the vehicle ECU 100 and the inverter control device 20, and a failure of any portion of the vehicle other than the inverter 10 such as the speed change device 90, for example.

Figure 3:
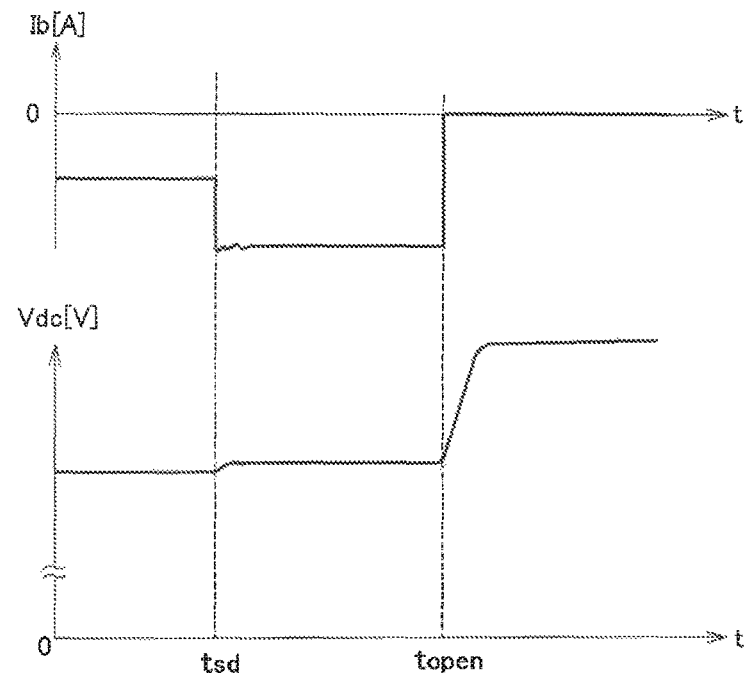
FIG. 3 is a waveform chart schematically illustrating responses of a battery current and a DC link voltage at the time of shut-down and contactor opening.

Shut-down control (SD) is known as an example of the fail-safe control. In the shut-down control, a switching control signal for all the switching elements 3 that constitute the inverter 10 is varied into a non-active state to bring the inverter 10 into an off state. At this time, the rotor of the rotary electric machine 80 is continuously rotating because of the inertia, generating a large counter electromotive force. When the rotor is rotating at a high speed, a motor line counter electromotive voltage (Vbemf) is much higher than the DC link voltage Vdc. The power generated by rotation of the rotor is rectified via the diode 5, and charges the high-voltage battery 11 through the contactor 9 in an on state. As illustrated in the waveform chart in the upper part of FIG. 3, when the shut-down control is started at a time tsd, the absolute value of a battery current Ib (DC power source current), which is a current for charging the high-voltage battery 11, is increased significantly. When the battery current Ib exceeds the rated current of the high-voltage battery 11, the high-voltage battery 11 may be exhausted or broken. Making the rated value of the high-voltage battery 11 higher so that the high-voltage battery 11 can withstand a larger battery current Ib may incur an increase in scale or an increase in cost.

When the contactor 9 is brought into an off state, an inflow of a current into the high-voltage battery 11 is blocked. As indicated in the waveform chart in the upper part of FIG. 3, the battery current Ib becomes zero. The current, an inflow of which into the high-voltage battery 11 has been blocked, charges the smoothing capacitor 4, which raises the DC link voltage Vdc. As indicated in the waveform chart in the lower part of FIG. 3, when the contactor 9 is brought into an off state at a time topen, for example, the DC link voltage Vdc is raised abruptly. When the DC link voltage Vdc exceeds the rated voltage (absolute maximum rating) of the inverter 10 (switching elements 3), the DC/DC converter 2, and the smoothing capacitor 4, such components may be damaged. Making the rated value of such components higher so as to allow a higher voltage may incur an increase in scale or an increase in cost.

Thus, it is desirable to execute the fail-safe control while suppressing an excessive increase in the battery current Ib at the time of charging the high-voltage battery 11 or the DC link voltage Vdc in the case where a failure has occurred in the rotary electric machine drive device 1 which includes the inverter 10. In the embodiment, in view of such a background, the inverter control device 20 performs effective fail-safe control.

As discussed above, the inverter control device 20 controls the rotary electric machine drive device 1 which includes the inverter 10, and is configured to perform switching control on the switching elements 3 which constitute the inverter 10 and to execute the fail-safe control in the case where a failure has occurred in the rotary electric machine drive device 1. The inverter control device 20 selectively executes shut-down control (SD) and active short circuit control (ASC) as the fail-safe control. In the shut-down control, all the switching elements 3 of the inverter 10 are brought into an off state. In the active short circuit control, either of the upper switching elements 31 of all the arms for the multiple phases and the lower switching elements 32 of all the arms for the multiple phases are brought into an on state, and the other switching elements are brought into an off state. That is, a current is circulated between the rotary electric machine 80 and the inverter 10. Control in which the upper switching elements 31 of all the arms for the multiple phases are brought into an on state and in which the lower switching elements 32 of all the arms for the multiple phases are brought into an off state is referred to as "upper-side active short circuit control". Meanwhile, control in which the lower switching elements 32 of all the arms for the multiple phases are brought into an on state and in which the upper switching elements 31 of all the arms for the multiple phases are brought into an off state is referred to as "lower-side active short circuit control".

Figure 4:
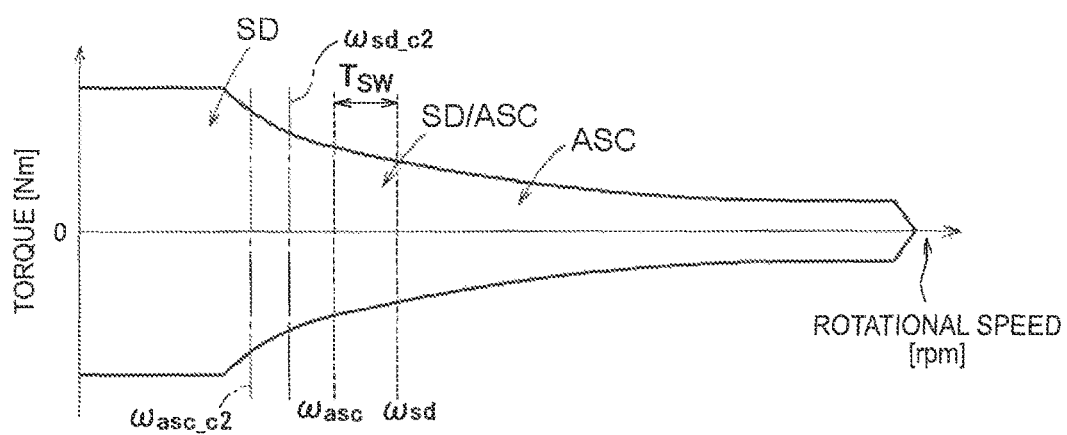
FIG. 4 illustrates the relationship between the rotational speed and fail-safe control.

In the embodiment, the inverter control device 20 executes, as the fail-safe control, the active short circuit control (ASC) in a high rotational speed region and the shut-down control (SD) in a low rotational speed region, which is on the low rotational speed side with respect to the high rotational speed region, in accordance with at least the rotational speed of the rotary electric machine 80. FIG. 4 illustrates an example of a torque map illustrating the relationship between the rotational speed and torque of the rotary electric machine. In the drawing, symbol $\omega_{sd}$ indicates a maximum rotational speed (SD maximum rotational speed) at which execution of the shut-down control is allowed. A region in which the rotational speed is higher than the SD maximum rotational speed (or a region in which the rotational speed is equal to or more than the SD maximum rotational speed) is the high rotational speed region. A region on the low rotational speed side with respect to the high rotational speed region, that is, a region in which the rotational speed is lower than the SD maximum rotational speed (or a region in which the rotational speed is equal to or less than the SD maximum rotational speed) is the low rotational speed region. The boundary condition such as "equal to or more than/equal to or less than" and "higher than/lower than (less than)" may be set as appropriate, and does not limit the configuration of the fail-safe control. The same applies to other boundaries indicated in the following description.

The inverter control device 20 causes the control scheme of the fail-safe control to transition in accordance with the rotational speed of the rotary electric machine 80 during execution of the shut-down control. Specifically, in the case where the rotational speed of the rotary electric machine 80 is raised to the high rotational speed region during execution of the shut-down control, the inverter control device 20 causes the control scheme to transition to the active short circuit control. In the case where the rotational speed of the rotary electric machine 80 is lowered to the low rotational speed region during execution of the active short circuit control, on the other hand, the inverter control device 20 causes the control scheme to transition to the shut-down control. For the transition, a hysteresis section (transition section Tsw) illustrated in FIG. 4 is provided between the low rotational speed region and the high rotational speed region. For transition of the control scheme to the shut-down control during execution of the active short circuit control, a region on the low rotational speed side with respect to symbol $\omega_{asc}$ FIG. 4 corresponds to the low rotational speed region. Symbol $\omega_{asc}$ indicates a minimum rotational speed (ASC minimum rotational speed) at which execution of the active short circuit control is allowed.

Figure 5:
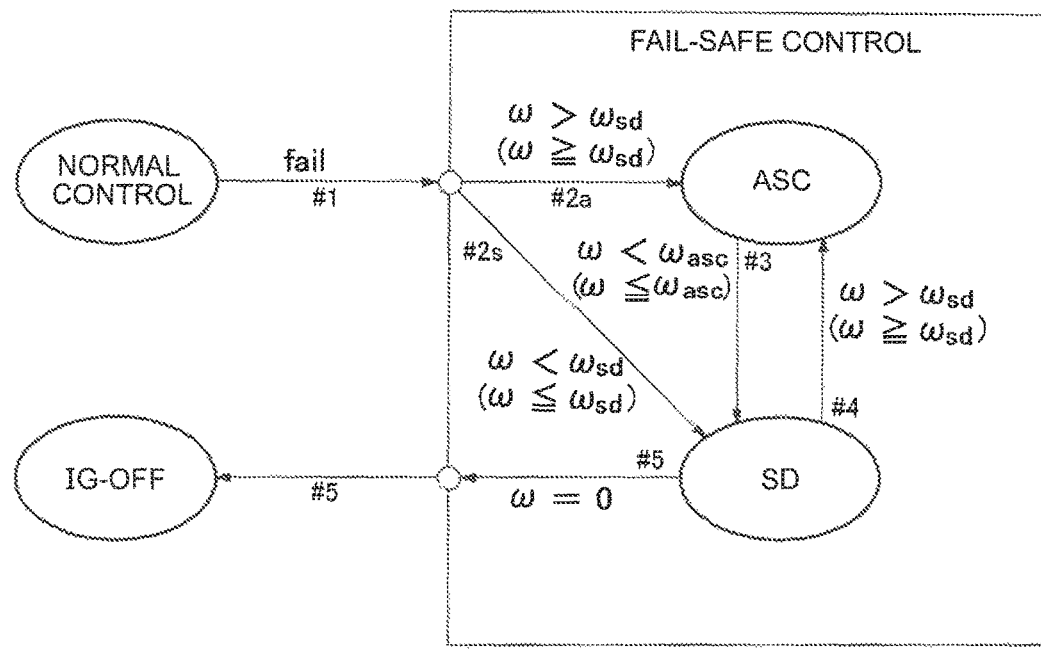
FIG. 5 illustrates state transition during the fail-safe control.

The state transition during the fail-safe control will be described with reference to the state transition diagram of FIG. 5. The normal control in the drawing indicates a state in which normal control is executed with the contactor 9 not brought into an off state and with no failure having occurred in the vehicle, the rotary electric machine 80, the speed change device 90, the inverter 10, or the like. In the case where any failure has occurred in the rotary electric machine drive device 1 during the normal control, information "fail" indicating that a failure has occurred is transferred to the inverter control device 20 (#1). In response to the information "fail", the inverter control device 20 determines the control scheme of the fail-safe control on the basis of the rotational speed of the rotary electric machine 80. In the case where a rotational speed ω is higher than the SD maximum rotational speed $\omega_{sd}$, the active short circuit control (ASC) is selected (#2a). In the case where the rotational speed ω is lower than the SD maximum rotational speed $\omega_{sd}$, on the other hand, the shut-down control (SD) is selected (#2s). That is, at the time of the start of the fail-safe control, a region on the high rotational speed side with respect to the SD maximum rotational speed $\omega_{sd}$ is the high rotational speed region, and a region on the low rotational speed side with reference to the SD maximum rotational speed $\omega_{sd}$ is the low rotational speed region. In the embodiment, in the case where the rotational speed ω is included in the transition section Tsw, the shut-down control (SD) is selected.

When the rotational speed ω falls below the ASC minimum rotational speed $\omega_{asc}$ during execution of the active short circuit control (ASC), the control scheme is caused to transition to the shut-down control (SD) (#3). That is, once the active short circuit control (ASC) is executed, a region on the high rotational speed side with reference to the ASC minimum rotational speed $\omega_{asc}$ is the high rotational speed region, and a region on the low rotational speed side with reference to the ASC minimum rotational speed $\omega_{asc}$ is the low rotational speed region. When the rotational speed ω becomes higher than the SD maximum rotational speed $\omega_{sd}$ during execution of the shut-down control (SD), on the other hand, the control scheme is caused to transition to the active short circuit control (ASC) (#4). In this case, a region on the high rotational speed side with respect to the SD maximum rotational speed $\omega_{sd}$ is the high rotational speed region, and a region on the low rotational speed side with reference to the SD maximum rotational speed $\omega_{sd}$ is the low rotational speed region. A case where the rotational speed of the wheels W is raised as the vehicle descends a slope or a step and such a rise in rotational speed is transferred to the rotary electric machine 80 is assumed as a case where the rotational speed ω becomes higher during execution of the fail-safe control.

Basically, the rotational speed of the rotary electric machine 80 becomes gradually lower as the fail-safe control is continuously executed. Thus, the control scheme converges to the shut-down control (SD). When the rotational speed ω becomes zero during execution of the shut-down control (SD), the inverter control device 20 informs the vehicle ECU 100, which is a higher-level control device, that the rotary electric machine 80 has been stopped safely. The vehicle ECU 100 brings the ignition key (IG key) of the vehicle into an off state (#5: IG-OFF). Alternatively, the vehicle ECU 100 provides a notification to prompt a passenger to operate the ignition key so that the ignition key is operated into an off state by the passenger.

The setting of the SD maximum rotational speed $\omega_{sd}$ and the ASC minimum rotational speed $\omega_{asc}$ discussed above will be described below. In the shut-down control, as discussed above with reference to FIG. 3, it is necessary to pay attention to the following two points. The first point is the magnitude of the battery current Ib when the contactor 9 in an on state. The second point is a rise in the DC link voltage Vdc when the contactor 9 in an off state. Thus, the SD maximum rotational speed $\omega_{sd}$ is preferably set in consideration of such two points. For example, the lower rotational speed, of the values set in consideration of each of such points, is preferably set as the SD maximum rotational speed $\omega_{sd}$.

Figure 6:
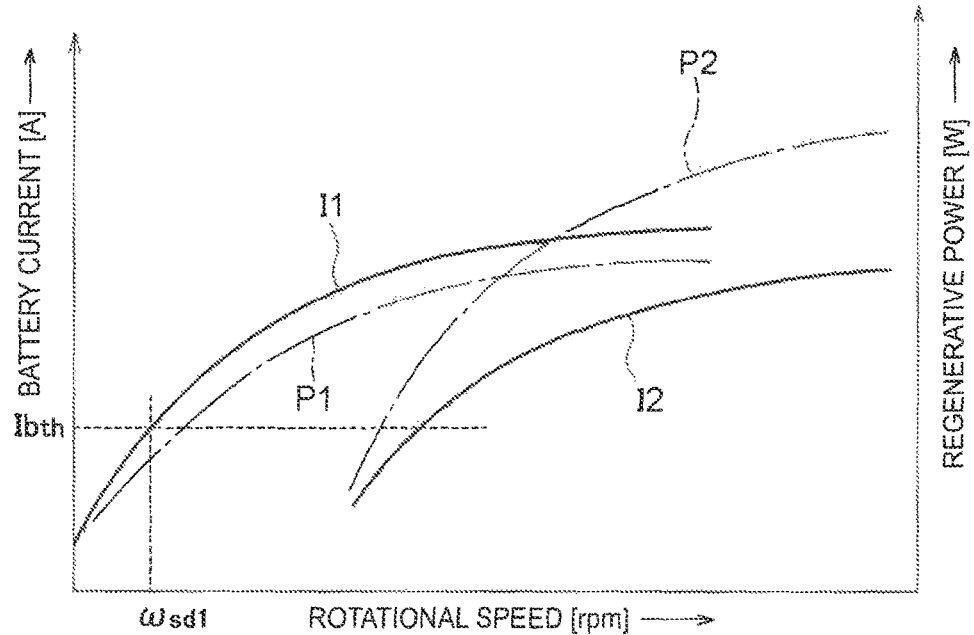
FIG. 6 illustrates the relationship between regenerative power and the battery current and the rotational speed.

In view of the first point, the SD maximum rotational speed $\omega_{sd}$ is preferably set to a rotational speed at which the battery current Ib and regenerative power which match the rotational speed of the rotary electric machine 80 are less than allowable maximum rated values in accordance with the battery voltage (DC power source voltage) (e.g. at a lower limit value within the rated range of the battery voltage) in the case where the contactor 9 is in an on state. FIG. 6 illustrates the relationship between the rotational speed and the battery current Ib (I1 and I2) and the relationship between the rotational speed and regenerative power (P1 and P2). In the drawing, the solid lines I1 and I2 indicate the battery current Ib, and the dash-and-dot lines P1 and P2 indicate regenerative power. The lines I2 and P2 indicate the battery current (I2) and regenerative power (P2) for a case where the battery voltage has an upper limit value within the rated range of the high-voltage battery 11. The lines I1 and P1 indicate the battery current (I1) and regenerative power (P1) for a case where the battery voltage has a lower limit value within the rated range of the high-voltage battery 11. It is seen that the battery current Ib flows in more easily as the battery voltage is lower, and that a higher battery current Ib flows in a lower rotational speed range. Hence, the SD maximum rotational speed $\omega_{sd}$ is preferably set to a rotational speed ($\omega_{sd1}$) at which the battery current Ib becomes less than an allowable maximum rated value (Ibth) in the case where the battery voltage has a lower limit value within the rated range of the high-voltage battery 11.

A mode in which the SD maximum rotational speed $\omega_{sd}$ ($\omega_{sd1}$) is set with reference to the maximum rated value (Ibth) at which the battery current Ib is allowed has been described herein. However, the SD maximum rotational speed cod may be set with reference to a maximum rated value (not illustrated) at which regenerative power is allowed. As a matter of course, the lower rotational speed, of the rotational speeds set on the basis of the two maximum rated values, is preferably set as the SD maximum rotational speed $\omega_{sd}$.

Figure 7:
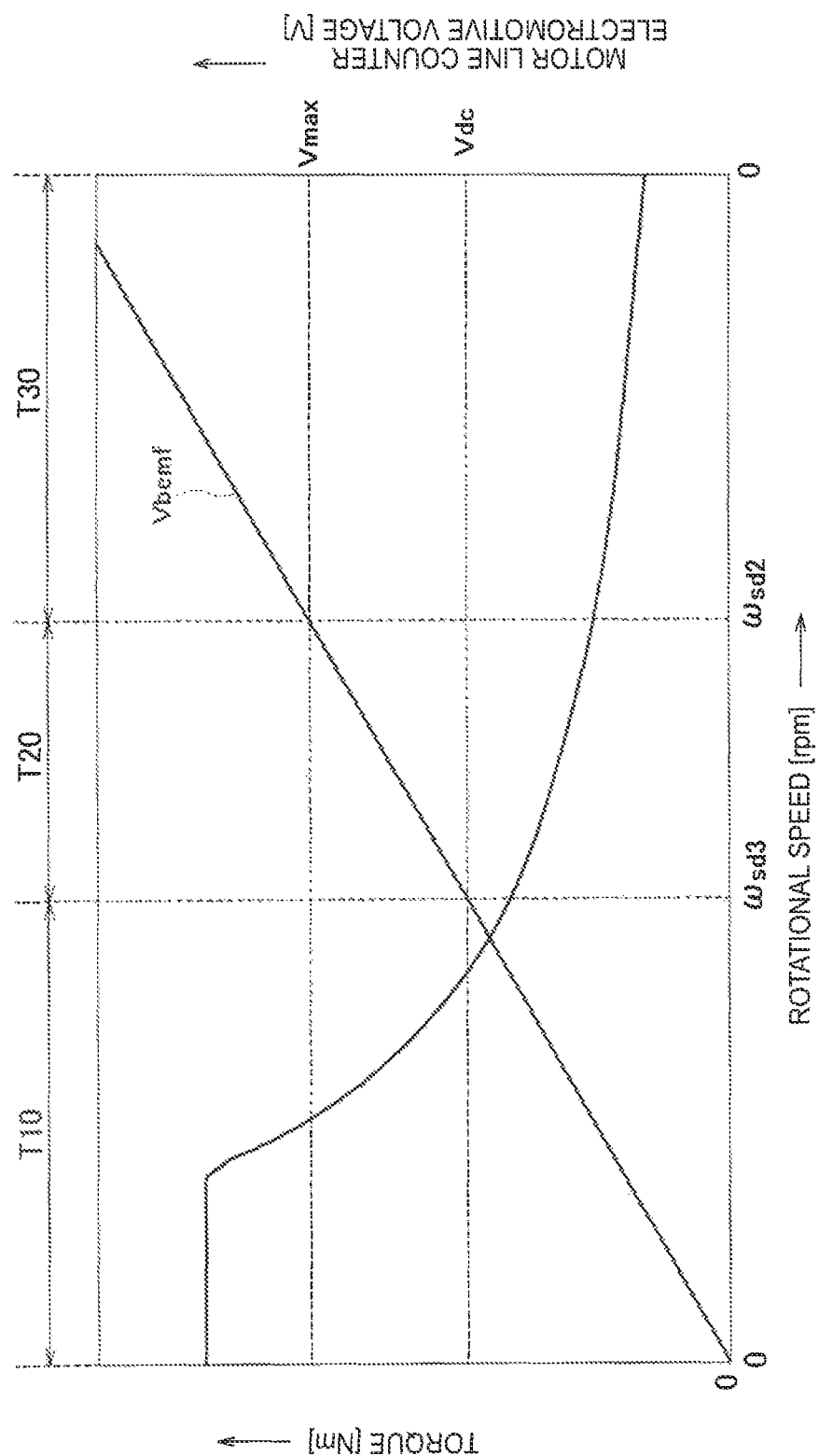
FIG. 7 illustrates the relationship between the motor line counter electromotive voltage and the rotational speed.

In view of the second points, the SD maximum rotational speed $\omega_{sd}$ is preferably set to a rotational speed at which the peak value of a counter electromotive force among the lines for three phases is less than the maximum rated voltage allowed in the rotary electric machine drive device 1 in the case where the contactor 9 is in an off state. FIG. 7 illustrates the relationship between the rotational speed and the motor line counter electromotive voltage Vbemf in a partial enlarged version of the torque map of FIG. 4. FIG. 7 simply illustrates the relationship between the rotational speed and the motor line counter electromotive voltage Vbemf, without the on/off state of the contactor 9 taken into consideration. The determination of the on/off state of the contactor 9 may be made on the basis of communication from the vehicle ECU 100, or may be made on the basis of the result of detection by a voltage sensor 14 that detects the DC link voltage Vdc, for example. Alternatively, the determination of the on/off state of the contactor 9 may be made on the basis of abrupt variations in current (battery current Ib) of the high-voltage battery 11 which is detected by a battery current sensor 15.

In the drawing, a voltage Vmax indicates the value of the lowest voltage among the maximum rated voltages allowed in the rotary electric machine drive device 1, that is, among the maximum rated voltages of the DC/DC converter 2, the smoothing capacitor 4, and the inverter 10 (switching elements 3). In the case where the contactor 9 is in an off state, the motor line counter electromotive voltage Vbemf is applied as it substantially is to the DC side of the inverter 10. Thus, in the case where the contactor 9 is in an off state, the shut-down control is preferably prohibited in a region (T30) in which the rotational speed is higher than a rotational speed ($\omega_{sd2}$) at which the motor line counter electromotive voltage Vbemf, which is raised in proportion to the rotational speed, reaches the maximum rated voltage Vmax. Thus, in the case where the contactor 9 is in an off state, a rotational speed ($\omega_{sd2}$) at which the motor line counter electromotive voltage Vbemf reaches the maximum rated voltage Vmax can be set as the SD maximum rotational speed $\omega_{sd}$.

In the case where the contactor 9 is in an on state, on the other hand, a voltage from the high-voltage battery 11 (or an output from the DC/DC converter 2) is applied to the DC side of the inverter 10 to serve as the DC link voltage Vdc. When the motor line counter electromotive voltage Vbemf exceeds the DC link voltage Vdc during the shut-down control, for example, the diodes 5 which are connected in anti-parallel with the switching elements 3 become conductive. That is, a current for charging the high-voltage battery 11 is supplied. Therefore, in order to set the SD maximum rotational speed $\omega_{sd}$, it is necessary to take the battery current Ib, regenerative power, regenerative torque, and so forth into consideration as described in relation to the first point to be considered. Thus, the shut-down control can be performed conditionally in a region (T20) from a rotational speed ($\omega_{sd3}$) at which the motor line counter electromotive voltage Vbemf reaches the DC link voltage Vdc to the rotational speed ($\omega_{sd2}$) at which the motor line counter electromotive voltage Vbemf reaches the maximum rated voltage Vmax. The shut-down control can be performed without special conditions in a region (T10) on the low rotational speed side with respect to the rotational speed ($\omega_{sd3}$) at which the motor line counter electromotive voltage Vbemf reaches the DC link voltage Vdc.

The SD maximum rotational speed $\omega_{sd}$ may be set to the lower value of the rotational speed ($\omega_{sd2}$) at which the motor line counter electromotive voltage Vbemf reaches the maximum rated voltage Vmax and the SD maximum rotational speed $\omega_{sd}$ ($\omega_{sd1}$) which is based on the maximum rated value (Ibth) of the battery current Ib. Alternatively, the SD maximum rotational speed $\omega_{sd}$ may be set to the lowest value of values including the above values and additionally including the rotational speed ($\omega_{sd3}$) at which the motor line counter electromotive voltage Vbemf reaches the DC link voltage Vdc.

In the case where the contactor 9 is in an off state, a current that cannot flow into the high-voltage battery 11 charges the smoothing capacitor 4 as discussed above. As the capacity of the smoothing capacitor 4 is larger, the speed at which the voltage across the terminals of the smoothing capacitor 4 is raised is lower. If the capacity of the smoothing capacitor 4 which smoothes the DC link voltage Vdc is reduced, the speed at which the DC link voltage Vdc is raised is increased. Even if the withstanding voltage of the switching elements 3 is higher, the withstanding voltage of the smoothing capacitor 4 is not varied from a conventional value, and thus it is highly possible that the maximum rated voltage allowed in the rotary electric machine drive device 1 is the maximum rated voltage of the smoothing capacitor 4. Thus, in one aspect, the SD maximum rotational speed $\omega_{sd}$ is preferably set such that the voltage of the smoothing capacitor, which is raised by a charge supplied from the rotary electric machine 80 during execution of the shutdown control, is less than the allowable maximum value in accordance with the capacity of the smoothing capacitor 4 in the case where the contactor 9 is in an off state. In this case, as indicated by the dash-and-dot lines in FIG. 4, the SD maximum rotational speed $\omega_{sd}$ and the ASC minimum rotational speed $\omega_{asc}$ are set on the lower rotational speed side ($\omega_{sd\_c2}$ and an ASC minimum rotational speed $\omega_{asc\_c2}$). If the SD maximum rotational speed $\omega_{sd}$ and the ASC minimum rotational speed $\omega_{asc}$ indicated by the dotted lines in FIG. 4 have values for a case where the capacity of the smoothing capacitor 4 is "C1", the SD maximum rotational speed $\omega_{sd\_c2}$ and the ASC minimum rotational speed $\omega_{asc\_c2}$ have values for a case where the capacity of the smoothing capacitor 4 is "C2". Here, C1 is larger than C2.

Next, setting of the ASC minimum rotational speed $\omega_{asc}$ will be described. In the active short circuit control, it is necessary to pay attention to the following two points. The first point is deceleration (variations in vehicle behavior to be transmitted to the passenger) caused by negative torque, which is generated by a current circulated between the rotary electric machine 80 and the inverter 10, transferred to the wheels W. The second point is a possibility that a permanent magnet is demagnetized with the temperature of the stator raised when the stator is heated by a current circulated through the stator coils 8 of the rotary electric machine 80. In particular, in the case where the active short circuit control is continuously performed for a long time, a rise in temperature of the stator may be a problem. That is, the ASC minimum rotational speed $\omega_{asc}$ is preferably set in consideration of such two points. In particular, as discussed later, negative torque tends to become larger as the rotational speed becomes lower with its peak at a certain rotational speed in the low rotational speed region. Thus, in order to restrict negative torque, a lower limit rotational speed (ASC minimum rotational speed $\omega_{asc}$) at which execution of the active short circuit control is restricted is preferably set. The higher rotational speed, of the respective values set in consideration of the first and second points, is preferably set as the ASC minimum rotational speed $\omega_{asc}$.

Figure 8:
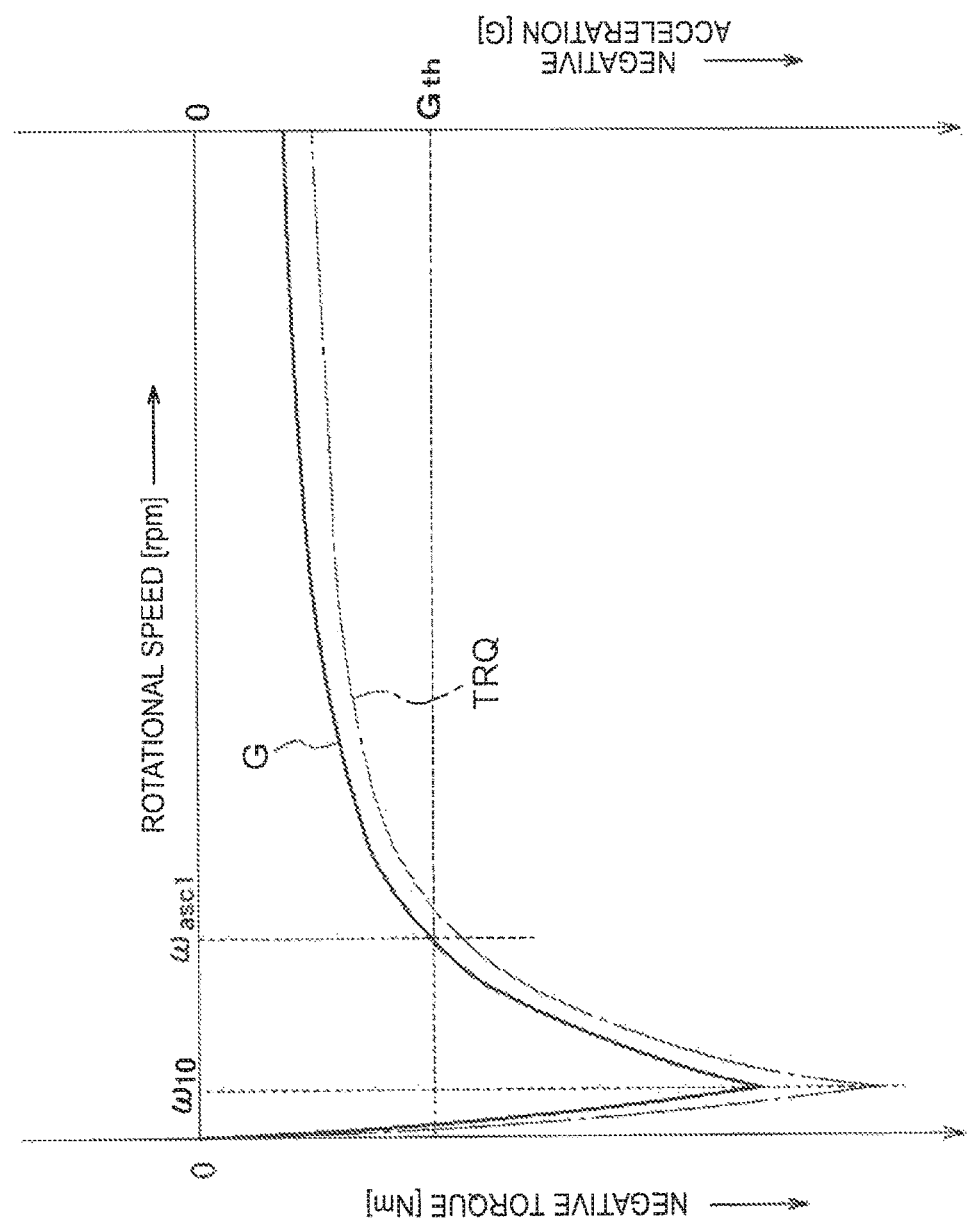
FIG. 8 illustrates the relationship between negative torque and negative acceleration transferred to wheels and the rotational speed.

In view of the first point, the minimum rotational speed (ASC minimum rotational speed $\omega_{asc}$) at which execution of the active short circuit control is allowed is preferably set to a rotational speed at which the absolute value of negative torque transferred to the wheels W during execution of the active short circuit control is less than the absolute value of maximum allowable negative torque prescribed in advance. FIG. 8 is a graph illustrating the relationship between the rotational speed and negative torque and between the rotational speed and negative acceleration. In the drawing, the dash-and-dot line indicates negative torque TRQ, and the solid line indicates negative acceleration G. The negative torque TRQ and the negative acceleration G are computed on the basis of the diameter of the wheels W, the speed ratio of the speed change device 90, the weight of the vehicle, the value of a steady current at each rotational speed, etc.

Here, symbol Gth in the drawing is the maximum allowable negative torque (maximum allowable negative acceleration) converted into negative acceleration. An experiment etc. by the inventors has proved that a continuation of the maximum allowable acceleration Gth for a certain time (a time prescribed by the experiment or the specifications; e.g. t seconds) or more is not preferable. The time (t seconds) is preferably a time that enables the control scheme to transition in consideration of the response time of the inverter control device 20. Alternatively, negative acceleration that is allowable even if such negative acceleration is kept for a time that enables the control scheme to transition in consideration of the response time of the inverter control device 20 may be determined as the maximum allowable acceleration Gth. From the above, a rotational speed $\omega_{asc1}$ at which the negative acceleration G reaches the maximum allowable acceleration is preferably set as the ASC minimum rotational speed $\omega_{asc}$.

Figure 9:
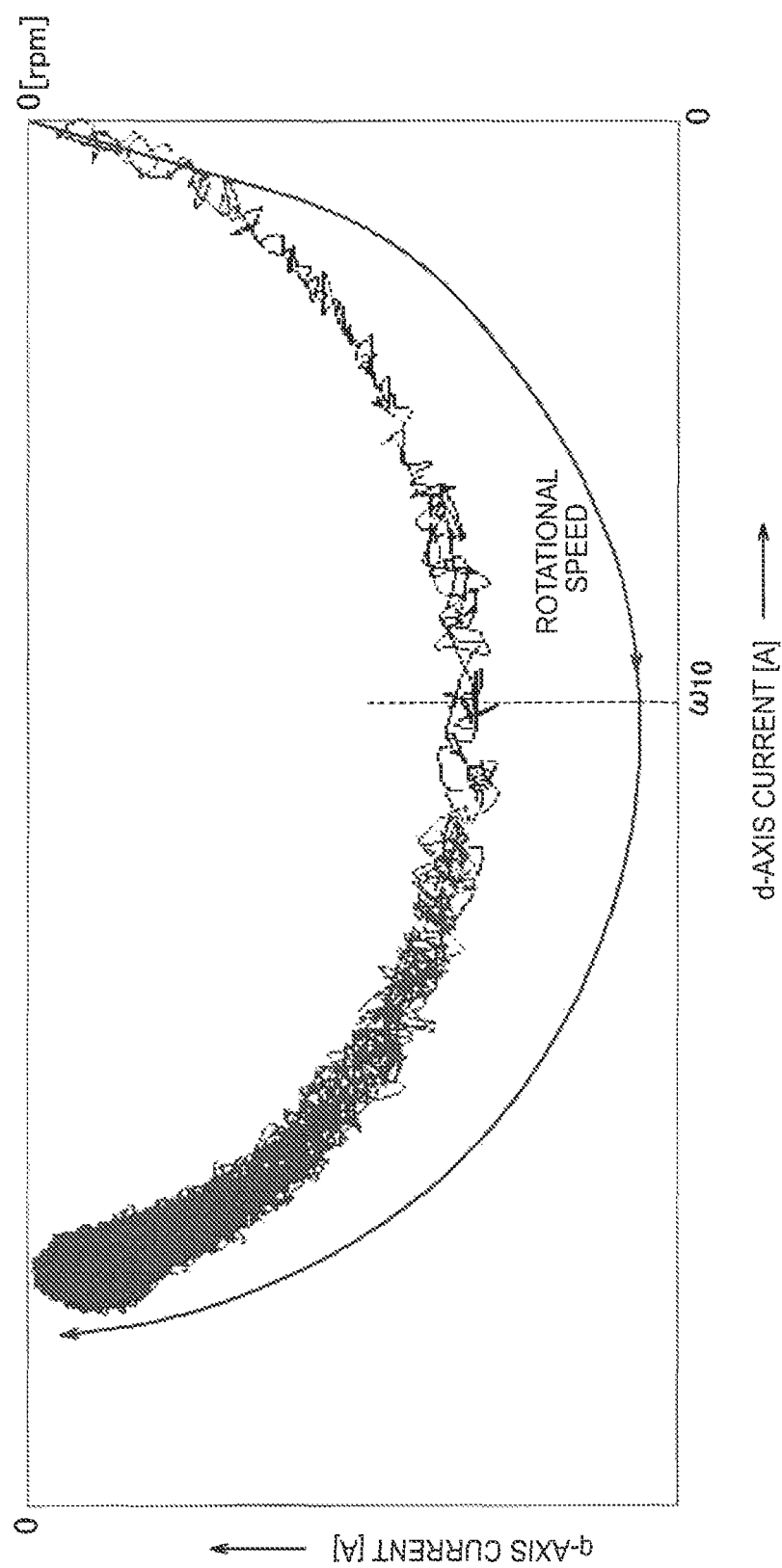
FIG. 9 illustrates a vector locus in a d-q-axis vector coordinate system of a steady current during active short circuit control.

As illustrated in FIG. 8, the absolute values of the negative torque TRQ and the negative acceleration G become largest at a rotational speed $\omega10$ which is lower than the ASC minimum rotational speed $\omega_{asc}$, and are abruptly decreased as the rotational speed is varied toward zero. This is ascribable to circulating current components, specifically a d-axis component and a q-axis component in vector control. As well known, the d-axis component is a current component for forming a field, and the q-axis component is a current component that serves as torque. FIG. 9 illustrates the result of simulating a vector locus in a d-q-axis vector coordinate system of a steady current during execution of the active short circuit control. In the drawing, both the d-axis current and the q-axis current have negative values. As indicated by the arcuate arrow in FIG. 9, as the rotational speed $\omega$ is raised from zero, the absolute value of the d-axis component and the absolute value of the q-axis component are increased, and the absolute value of the q-axis component is maximized at the rotational speed $\omega10$. As the rotational speed is raised past $\omega10$, the absolute value of the d-axis component is raised continuously, but the q-axis component is decreased. In this way, the q-axis component is maximized at the rotational speed $\omega10$, and thus negative torque (and negative acceleration) is maximized at the rotational speed $\omega10$.

Figure 10:
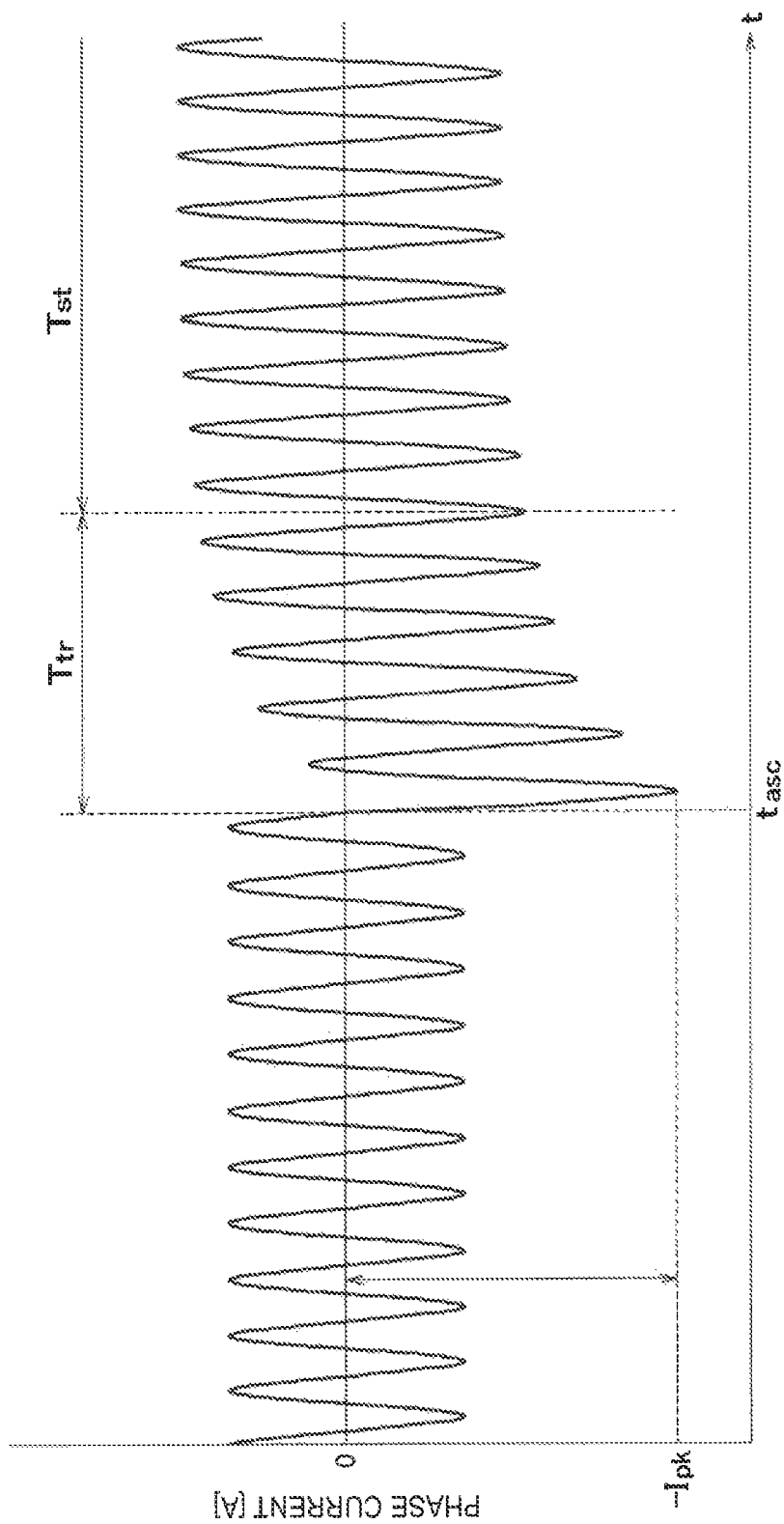
FIG. 10 is a waveform chart illustrating a phase current around the start of the active short circuit control.

In view of the second point, the minimum rotational speed (ASC minimum rotational speed $\omega_{asc}$) at which execution of the active short circuit control is allowed is preferably set to a rotational speed at which a phase current that flows during execution of the active short circuit control is less than the maximum value in the range of a current in which the magnetic force of a permanent magnet of the rotary electric machine 80 can be held at the maximum temperature at which the rotary electric machine 80 is operable. FIG. 10 illustrates the result of simulating a phase current of the rotary electric machine 80 around a time ($t_{asc}$) to start the active short circuit control. In FIG. 10, for simplification, a phase current for one phase, of the multi-phase AC currents, is illustrated. As illustrated in FIG. 10, when the active short circuit control is started at time $t_{asc}$, a transient current flows as the phase current. The transient current is continued during a transient response period ($T_{tr}$). The transient response period ($T_{tr}$) is followed by a steady period ($T_{st}$), in which a steady current flows stably as the phase current. The temperature of the stator coils of the rotary electric machine 80 is raised because of both the transient current and the steady current. In the example of FIG. 10, the maximum current (absolute value) is "|–Ipk|" of the transient current. As discussed above, a temperature sensor can be attached to the rotary electric machine 80. It should be noted, however, that the temperature of a permanent magnet is not always directly measurable by the temperature sensor. Thus, the temperature of the stator coils 8 is preferably measured and converted into the temperature of the permanent magnet, for example.

Here, the maximum temperature at which the magnetic force of the permanent magnet can be held is defined as Tmg_max, for example. The inventors confirmed that, when a current in a steady state flowed through the stator coils 8 at a current density calculated experimentally (a current density [$A_{rms}/\text{mm}^2$] in terms of effective value), the temperature of the stator coils 8 was raised at a proportion of approximately 1 [° C./sec]. For example, in the case where the temperature of the permanent magnet is lower than Tmg_max by 10 [° C.], it takes about 10 seconds before Tmg_max is reached, during which the control scheme of the fail-safe control can be caused to transition.

Figure 11:
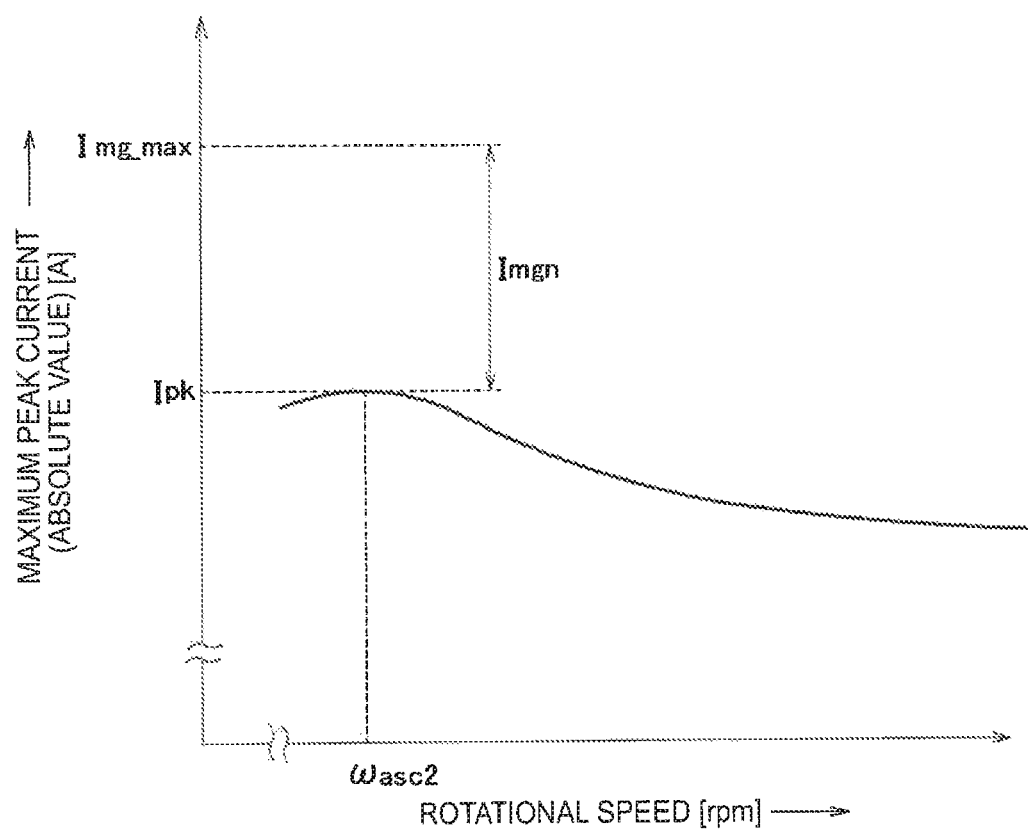
FIG. 11 illustrates the relationship between the maximum peak current of the phase current and the rotational speed during the active short circuit control.

The solid line of FIG. 11 approximates the relationship between the rotational speed and the absolute value of the maximum peak current under a condition that the temperature of the magnet is lower than Tmg_max by 10 [° C.]. Here, the term "maximum peak current" refers to the maximum value of not only a steady current but also a transient current. The approximate curve for the maximum current illustrated in FIG. 11 indicates that the temperature of the magnet is lower than Tmg_max by 10 [° C.], and takes a maximum value Ipk when the rotational speed of the rotary electric machine 80 is "$\omega_{asc2}$". It was confirmed that a sufficient margin Imgn was secured between the maximum value Ipk and a current value Img_max at which demagnetization was caused. In this case, the magnetic force of the permanent magnet of the rotary electric machine 80 can be held in all the rated range of the rotary electric machine 80. The margin Imgn becomes smaller as the temperature of the magnet becomes higher.

2. Second Embodiment

Next, an inverter control device according to a second embodiment will be described. In the present embodiment, the inverter control device 20 selectively executes the active short circuit control (ASC) and the shut-down control (SD) in accordance with the modulation control scheme of the inverter 10 for a case where a failure has occurred in the rotary electric machine drive device, which constitutes a difference from the first embodiment described above in which the inverter control device 20 selectively executes the active short circuit control (ASC) and the shut-down control (SD) in accordance with the rotational speed of the rotary electric machine 80. The differences between the inverter control device 20 according to the present embodiment and that according to the first embodiment described above will be mainly described below. The same points as those in the first embodiment described above will not be specifically described.

In the present embodiment as well, the inverter control device 20 controls the rotary electric machine 80 via the inverter 10 by performing current feedback control using a vector control method to be discussed later on the basis of target torque TM for the rotary electric machine 80 provided as a request signal from another control device or the like such as the vehicle ECU 100 via a CAN (Controller Area Network) or the like, for example. The inverter control device 20 is configured to have a variety of functional sections for the current feedback control, which are each implemented through cooperation between hardware such as a microcomputer and software (program).

The inverter control device 20 has at least two control modes, namely pulse width modulation (PWM) control and rectangular-wave control (one-pulse control (1P)), as the mode of the switching pattern (mode of voltage waveform control) for the switching elements 3 which constitute the inverter 10. In addition, the inverter control device 20 has, as the mode of field control for the stator of the rotary electric machine 80, normal field control such as maximum torque control in which maximum torque is output for a current that flows through the stator coils 8 and maximum efficiency control in which the motor is driven at the maximum efficiency for a motor current, and field weakening control (Automatic Field Regulation (AFR) control) in which a field current (field weakening current) is applied to weaken field magnetic flux.

In the embodiment, the rotary electric machine 80 is controlled by executing current feedback control using a current vector control method in a two-axis orthogonal vector coordinate system that rotates in synchronization with rotation of the rotary electric machine 80. In the current vector control method, the current feedback control is performed in the two-axis orthogonal vector coordinate system which is defined by a d-axis which extends along the direction of field magnetic flux generated by a permanent magnet and a q-axis which is electrically advanced by $\pi/2$ with respect to the d-axis, for example. The inverter control device 20 decides d-axis and q-axis current commands on the basis of the target torque TM (torque command) for the rotary electric machine 80 to be controlled. Actual currents that flow through the stator coils 8 of the rotary electric machine 80 for the respective phases are detected by the current sensor 12, and the inverter control device 20 acquires the detection result. In addition, the magnetic pole position of the rotor of the rotary electric machine 80 at each time point is detected by the rotation sensor 13 such as a resolver, for example, and the inverter control device 20 acquires the detection result. The actual currents for multiple phases (e.g. three phases) are subjected to a coordinate conversion into a d-q-axis orthogonal vector coordinate system on the basis of the magnetic pole position.

The inverter control device 20 executes proportional-integral control (PI control) or proportional-integral-derivative control (PID control) by calculating the deviation between the actual currents which have been subjected to a coordinate conversion into the d-q-axis orthogonal vector coordinate system and the current commands which are set in the d-q-axis orthogonal vector coordinate system to derive voltage commands in the d-q-axis orthogonal vector coordinate system. The voltage commands in the d-q-axis orthogonal vector coordinate system are subjected to a coordinate conversion into voltage commands corresponding to multi-phase (e.g. three-phase) AC power on the basis of the magnetic pole position. A switching control signal is generated on the basis of the voltage commands.

In the embodiment, as discussed above, the control modes for switching the inverter 10 include the pulse width modulation control and the rectangular-wave control. In the pulse width modulation control, the duty of each pulse is set such that a pulse width modulation waveform, which is the output voltage waveform of the inverter 10 for each of U-, V-, and W-phases, is constituted of a collection of pulses that constitute a high-level period for which the upper arm elements are in an on state and a low-level period for which the lower arm elements are in an on state, and such that the fundamental-wave component of the pulse width modulation waveform in a certain period forms a sinusoidal wave. In other words, the pulse width modulation control is a control scheme in which a plurality of pulses with different duties are output in one cycle of electrical angle. The pulse width modulation control includes sinusoidal pulse width modulation (SPWM: Sinusoidal PWM) control, space vector pulse width modulation (SVPWM: Space Vector PWM) control, discontinuous pulse width modulation (DPWM: Discontinuous PWM) control, and so forth known in the art.

Indices that indicate the rate of conversion from a DC voltage into an AC voltage include a modulation rate that indicates the proportion of the effective value of the line voltage of the multi-phase AC voltage with respect to the DC voltage. In general, the maximum modulation rate of the sinusoidal pulse width modulation (SPWM) control is about 0.61, and the maximum modulation rate of the space vector pulse width modulation (SVPWM) control is about 0.71. Voltage commands for the sinusoidal pulse width modulation control are generally sinusoidal in shape. Voltage commands for the space vector pulse width modulation control are generally sinusoidal in shape, although such voltage commands have some distortion caused by partially shifting the voltage commands vertically so that the inter-phase voltage of the three-phase voltage can be utilized effectively. Thus, in general, modulation by the space vector pulse width modulation control with a maximum modulation rate of up to about 0.71 is treated as "normal pulse width modulation". Meanwhile, a modulation scheme that has a modulation rate exceeding about 0.71, which is the maximum modulation rate of the space vector pulse width modulation control, is referred to as "overmodulation pulse width modulation" as a modulation scheme that has a modulation rate that is higher than the normal value. The discontinuous pulse width modulation (DPWM) control enables the overmodulation pulse width modulation, and has a maximum modulation rate of about 0.78. A modulation rate of 0.78 is the physical limit value. When the modulation rate reaches 0.78 in the discontinuous pulse width modulation control, rectangular-wave control (one-pulse control) in which one pulse is output in one cycle of electrical angle is performed. In the rectangular-wave control, the modulation rate is fixed at about 0.78, which is the physical limit value.

In the embodiment, in the pulse width modulation control, drive of the inverter 10 is controlled by controlling an armature current which is a vector synthesized from a field current (d-axis current) and a drive current (q-axis current) that extend along the axes of the d-q-axis orthogonal vector coordinate system. That is, the inverter control device 20 controls drive of the inverter 10 by controlling the current phase angle of the armature current (angle formed between the q-axis current vector and the armature current vector) in the d-q-axis orthogonal vector coordinate system. Thus, the pulse width modulation control is also referred to as "current phase control".

In the rectangular-wave control, in contrast, the inverter 10 is controlled by controlling the voltage phase of a multi-phase AC voltage. The voltage phase of an AC voltage corresponds to the phases of multi-phase voltage commands. In the embodiment, the rectangular-wave control is rotation synchronization control in which each of the switching elements 3 of the inverter 10 is turned on and off once per one cycle of electrical angle of the rotary electric machine 80 and in which one pulse is output for each phase per one cycle of electrical angle. In the embodiment, in the rectangular-wave control, the inverter 10 is driven by controlling the voltage phase of a multi-phase AC voltage. Thus, the rectangular-wave control is also referred to as "voltage phase control".

In this way, the inverter control device 20 has at least two control modes (control schemes), namely the pulse width modulation control and the rectangular-wave control, as the mode of the switching pattern (mode of voltage waveform control) for the switching elements 3 which constitute the inverter 10. In addition, the inverter control device 20 has at least two control modes (control schemes), namely normal field control and field weakening control, as the mode of field control for the stator of the rotary electric machine 80. The mode of the field control will be discussed later. In the embodiment, the control scheme is switched by combining the modes of the switching pattern and the field control. For example, there are provided a first control scheme (hereinafter occasionally referred to, as appropriate, as "pulse width modulation control (PWM)") in which the normal field control and the pulse width modulation control are performed and a second control scheme (hereinafter occasionally referred to, as appropriate, as "rectangular-wave control (AFR+1P)") in which the field weakening control and the rectangular-wave control are performed.

The field weakening control, which is a mode of the field control, will be described below. As the rotational speed of the rotary electric machine 80 becomes higher, an induced voltage (counter electromotive voltage) becomes higher, and an AC voltage (required voltage) required to drive the rotary electric machine 80 also becomes higher. When the required voltage exceeds the maximum AC voltage (maximum output voltage) that can be output from the inverter 10 through conversion of the DC link voltage Vdc at that time, required currents cannot be applied to the stator coils 8, and the rotary electric machine 80 cannot be controlled appropriately. Therefore, the inverter control device 20 has an automatic field regulator that performs field regulation (in this case, field weakening control in which the current phase is advanced compared to that in the maximum torque control) in which the current phase is adjusted such that the stator coils generate magnetic flux in the direction of weakening the field magnetic flux of the rotary electric machine 80. As discussed above, the d-axis current in the d-q-axis orthogonal vector coordinate system is a field current that contributes to generation of a field. For example, a d-axis current regulation command (field weakening current command) is derived on the basis of the actual modulation rate, and a d-axis current command and a q-axis current command are regulated on the basis of the d-axis current regulation command.

In the case where the upper switching elements 31 and the lower switching elements 32 of the arms of the inverter 10 are turned on/off in a complementary manner, a dead time, in which both the upper switching elements 31 and the lower switching elements 32 are turned off at the same time, is provided in order to prevent short-circuiting between the positive and negative poles of the arms. As a matter of course, a phase current does not flow during the dead time, and thus the modulation rate is lowered compared to a theoretical value. In the case where many pulses are used within one cycle of electrical angle as in the pulse width modulation, in particular, the number of times of switching within one cycle of electrical angle is larger than that in the rectangular-wave control, and the effect of the dead time is more significant. Therefore, even with a modulation scheme with a modulation rate that is as close as possible to 0.78 in theory such as the overmodulation pulse width modulation, for example, a modulation rate that is lower than the theoretical value can only be achieved in practice. As a result, when the control scheme is switched from the pulse width modulation control to the rectangular-wave control, the modulation rate may be raised significantly to cause a torque gap in which the output torque is varied abruptly.

The torque gap is relatively small in a high-rotation low-torque region, and large in a low-rotation high-torque region. That is, the torque gap is smaller when the rotational speed is higher, and thus it is conceivable to make the rotational speed at which the control scheme is switched higher as one method of suppressing a torque gap caused when a transition is made from the pulse width modulation control to the rectangular-wave control. As a matter of course, the counter electromotive force is also made larger, and thus it is necessary to start the field weakening control earlier in this case. For example, the field weakening control may be performed before the actual modulation rate reaches 0.78. In an overmodulation control region before a transition to the rectangular-wave control, the discontinuous pulse width modulation is executed, for example. In the overmodulation control region as well, the torque gap can be suppressed by executing the field weakening control.

In this way, the inverter control device 20 may be configured to be able to select three or more control schemes such as a control scheme in which the normal field control and the pulse width modulation control are performed, a control scheme in which the field weakening control and the overmodulation pulse width modulation control (discontinuous pulse width modulation control) are performed, and a control scheme in which the field weakening control and the rectangular-wave control are performed. However, it is only necessary that the inverter control device 20 should be able to selectively execute at least two control schemes including a control scheme (pulse width modulation control (PWM)) in which the normal field control and the pulse width modulation control are performed and a control scheme (rectangular-wave control (AFR+1P)) in which the field weakening control and the rectangular-wave control are performed.

In the embodiment as well, the inverter control device 20 performs the fail-safe control in order to restrict operation of the rotary electric machine 80 in the case where a failure has occurred in the rotary electric machine drive device 1. In the embodiment, the inverter control device 20 decides the control scheme of the fail-safe control in accordance with the modulation control scheme that is being executed when a failure has occurred in the rotary electric machine drive device 1. As discussed above, the inverter control device 20 selectively executes at least two modulation control schemes including the pulse width modulation control (PWM) which is a control scheme in which a plurality of pulses with different duties are output in one cycle of electrical angle, and rectangular-wave control (AFR+1 P) which is a control scheme which is performed along with the field weakening control in which regulation is performed in the direction of weakening the field of the rotary electric machine 80 and in which one pulse is output in one cycle of electrical angle. The inverter control device 20 executes the active short circuit control (ASC) in the case where a failure has occurred in the rotary electric machine drive device 1 during execution of the rectangular-wave control (AFR+1P), and executes the shut-down control (SD) in the case where a failure has occurred in the rotary electric machine drive device 1 during execution of the pulse width modulation control (PWM).

Figure 12:
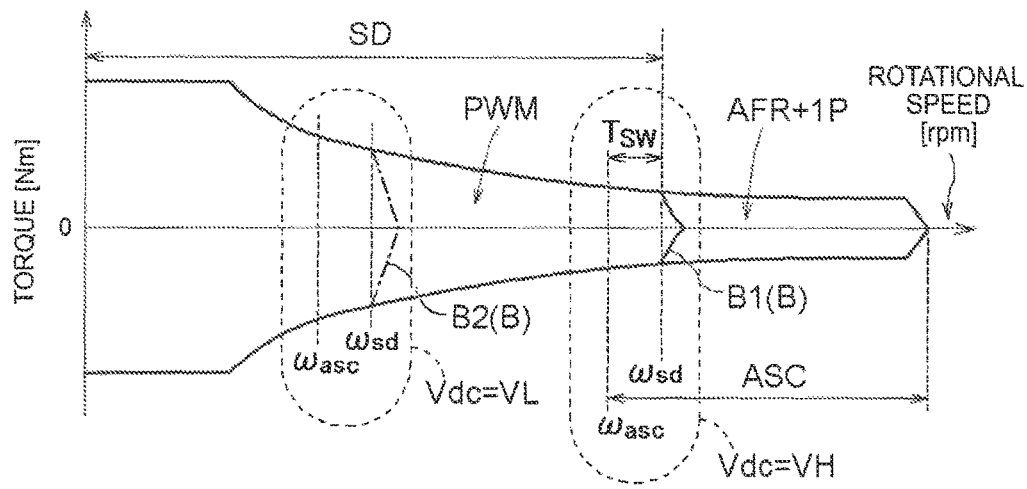
FIG. 12 illustrates the relationship between the rotational speed and fail-safe control according to a second embodiment.

FIG. 12 illustrates an example of a torque map illustrating the relationship between the rotational speed and torque of the rotary electric machine according to the embodiment. In the torque map, symbol B indicates the boundary between the modulation control schemes. B1 and B2 are indicated as the boundary, and are used on the basis of the difference in the DC link voltage Vdc. The boundary B1 indicates a boundary for a case where the DC link voltage Vdc is relatively high compared to the boundary B2. In the embodiment, the boundary B1 indicates a case where the DC link voltage Vdc has a maximum value VH within the rated range, and the boundary B2 indicates a case where the DC link voltage Vdc has a minimum value VL within the rated range. In the case where the DC link voltage Vdc is high, a higher counter electromotive voltage can be withstood, and therefore the pulse width modulation control (PWM) can be executed in a higher rotational speed range.

During execution of the fail-safe control according to one of the active short circuit control (ASC) and the shut-down control (SD) which has been selected in accordance with the modulation control scheme, the inverter control device 20 causes the control scheme of the fail-safe control to transition to the other of the active short circuit control (ASC) and the shut-down control (SD) on the basis of the rotational speed of the rotary electric machine 80. The rotational speed of the rotary electric machine 80 is varied also during execution of the fail-safe control. The magnitude of the counter electromotive force differs in accordance with the rotational speed. Thus, the control scheme of the fail-safe control is preferably caused to transition in accordance with the rotational state of the rotary electric machine 80 even if the fail-safe control is being executed in accordance with the once selected control scheme. It should be noted, however, that normal modulation control is not executed after the fail-safe control is started. Thus, the control scheme of the fail-safe control cannot be selected again on the basis of the modulation control scheme. Meanwhile, the counter electromotive force of the rotary electric machine 80 depends on the rotational speed of the rotary electric machine 80. Thus, the control scheme of the fail-safe control is preferably selected on the basis of the rotational speed of the rotary electric machine 80 after the fail-safe control is started.

In FIG. 12, symbol $\omega_{sd}$ indicates a maximum rotational speed (SD maximum rotational speed) at which execution of the shut-down control is allowed. Here, a region in which the rotational speed is higher than the SD maximum rotational speed $\omega_{sd}$ (or a region in which the rotational speed is equal to or more than the SD maximum rotational speed $\omega_{sd}$) is referred to as a "high rotational speed region", whereas a region on the low rotational speed side with respect to the high rotational speed region, that is, a region in which the rotational speed is lower than the SD maximum rotational speed $\omega_{sd}$ (or a region in which the rotational speed is equal to or less than the SD maximum rotational speed $\omega_{sd}$) is referred to as a "low rotational speed region". For transition of the control scheme of the fail-safe control from a control scheme that is being executed to another control scheme during execution of the fail-safe control, a hysteresis section (transition section Tsw) is provided. For example, for transition from the shut-down control (SD) to the active short circuit control (ASC), the boundary between the high rotational speed region and the low rotational speed region is set to the SD maximum rotational speed $\omega_{sd}$. For transition from the active short circuit control (ASC) to the shut-down control (SD), on the other hand, the boundary is set to the ASC minimum rotational speed $\omega_{asc}$ which is on the lower rotational speed side. The ASC minimum rotational speed $\omega_{asc}$ is the minimum rotational speed of the rotational speed of the rotary electric machine 80 at which execution of the active short circuit control (ASC) is allowed. In this case, a region in which the rotational speed is higher than the ASC minimum rotational speed $\omega_{asc}$ (or a region in which the rotational speed is equal to or more than the ASC minimum rotational speed $\omega_{asc}$) is the high rotational speed region. Meanwhile, a region on the low rotational speed side with respect to the high rotational speed region, that is, a region in which the rotational speed is lower than the ASC minimum rotational speed $\omega_{asc}$ (or a region in which the rotational speed is equal to or less than the ASC minimum rotational speed $\omega_{asc}$) is the low rotational speed region. The boundary condition such as "equal to or more than/equal to or less than" and "higher than/lower than (less than)" may be set as appropriate, and does not limit the configuration of the fail-safe control. The same applies to other boundaries indicated in the following description.

As discussed above, the inverter control device 20 causes the control scheme of the fail-safe control to transition in accordance with the rotational speed of the rotary electric machine 80 during execution of the shut-down control. Specifically, in the case where the rotational speed of the rotary electric machine 80 is raised to be equal to or more than the SD maximum rotational speed $\omega_{sd}$ (raised to the high rotational speed region) during execution of the shut-down control, the inverter control device 20 causes the control scheme to transition to the active short circuit control. In the case where the rotational speed of the rotary electric machine 80 is lowered to be equal to or less than the ASC minimum rotational speed $\omega_{asc}$ (lowered to the low rotational speed region) during execution of the active short circuit control, on the other hand, the inverter control device 20 causes the control scheme to transition to the shut-down control.

Figure 13:
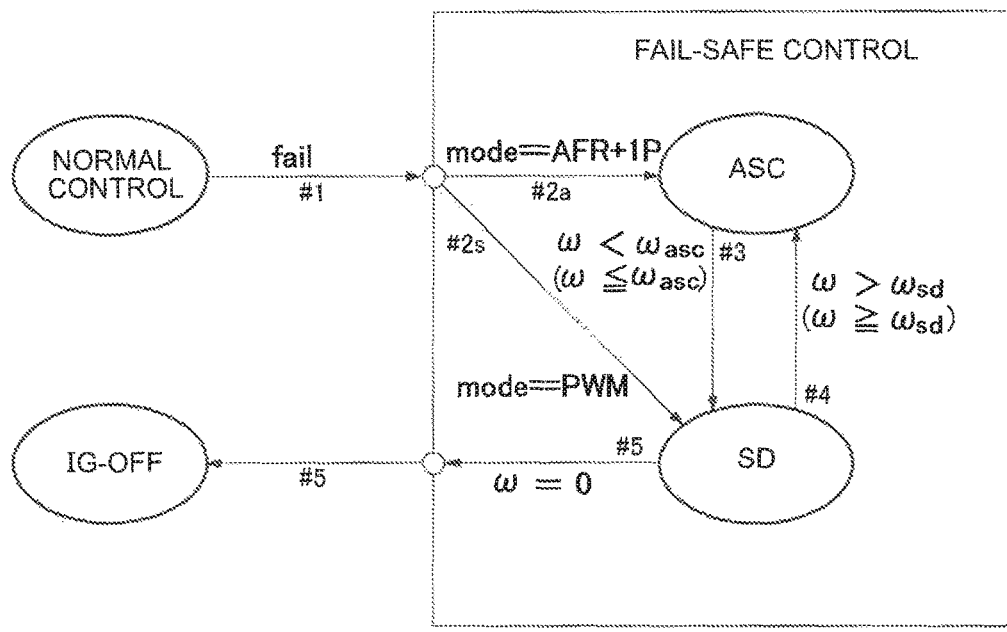
FIG. 13 illustrates state transition during the fail-safe control according to the second embodiment.

The state transition during the fail-safe control according to the embodiment will be described with reference to the state transition diagram of FIG. 13. The normal control in the drawing indicates a state in which normal control is executed with the contactor 9 not brought into an off state and with no failure having occurred in the vehicle, the rotary electric machine 80, the speed change device 90, the inverter 10, or the like. In the case where any failure has occurred in the rotary electric machine drive device 1 during the normal control, information "fail" indicating that a failure has occurred is transferred to the inverter control device 20 (#1). In response to the information "fail", the inverter control device 20 determines the control scheme of the fail-safe control on the basis of the modulation control scheme of the inverter 10. In the case where the modulation control scheme of the inverter 10 is the rectangular-wave control (AFR+1P), the active short circuit control (ASC) is selected (#2a). In the case where the modulation control scheme is the pulse width modulation control (PWM), on the other hand, the shut-down control (SD) is selected (#2s).

After execution of the fail-safe control is started, the control scheme of the fail-safe control is caused to transition in accordance with the rotational speed ω. When the rotational speed ω falls below the ASC minimum rotational speed $\omega_{asc}$ (the rotational speed ω is lowered to the low rotational speed region) during execution of the active short circuit control (ASC), the control scheme is caused to transition to the shut-down control (SD) (#3). When the rotational speed ac becomes higher than the SD maximum rotational speed $\omega_{sd}$ (the rotational speed co is raised to the high rotational speed region) during execution of the shut-down control (SD), on the other hand, the control scheme is caused to transition to the active short circuit control (ASC) (#4). A case where the rotational speed of the wheels W is raised as the vehicle descends a slope or a step and such a rise in rotational speed is transferred to the rotary electric machine 80 is assumed as a case where the rotational speed ω becomes higher during execution of the fail-safe control.

Basically, the rotational speed of the rotary electric machine 80 becomes gradually lower as the fail-safe control is continuously executed. Thus, the control scheme converges to the shut-down control (SD). When the rotational speed co becomes zero during execution of the shut-down control (SD), the inverter control device 20 informs the vehicle ECU 100, which is a higher-level control device, that the rotary electric machine 80 has been stopped safely. The vehicle ECU 100 brings the ignition key (IG key) of the vehicle into an off state (#5: IG-OFF). Alternatively, the vehicle ECU 100 provides a notification to prompt a passenger to operate the ignition key so that the ignition key is operated into an off state by the passenger.

During execution of the fail-safe control which has been selected in accordance with the modulation control scheme, the inverter control device 20 may cause the control scheme of the fail-safe control to transition from a control scheme that is being executed to another control scheme on the basis of not only the rotational speed of the rotary electric machine 80 but also the DC link voltage Vdc. As illustrated in FIG. 12, when the value of the DC link voltage Vdc differs, the boundary B at which the modulation control scheme is changed also differs. As illustrated in FIG. 12, the SD maximum rotational speed $\omega_{sd}$ and the ASC minimum rotational speed $\omega_{asc}$ are set in conjunction with the boundary B. Thus, in the state transition diagram illustrated in FIG. 13, the determination criteria (the SD maximum rotational speed $\omega_{sd}$ and the ASC minimum rotational speed $\omega_{asc}$) are considered to correspond to the DC link voltage Vdc. That is, the SD maximum rotational speed $\omega_{sd}$ and the ASC minimum rotational speed $\omega_{asc}$ are set in accordance with the DC link voltage Vdc, and the SD maximum rotational speed $\omega_{sd}$ and the ASC minimum rotational speed $\omega_{asc}$ are set to a smaller value as the DC link voltage Vdc is lower. The idea for setting the SD maximum rotational speed $\omega_{sd}$ and the ASC minimum rotational speed $\omega_{asc}$ is the same as that described above in relation to the first embodiment, and thus is not described here.

3. Third Embodiment

Figure 14:
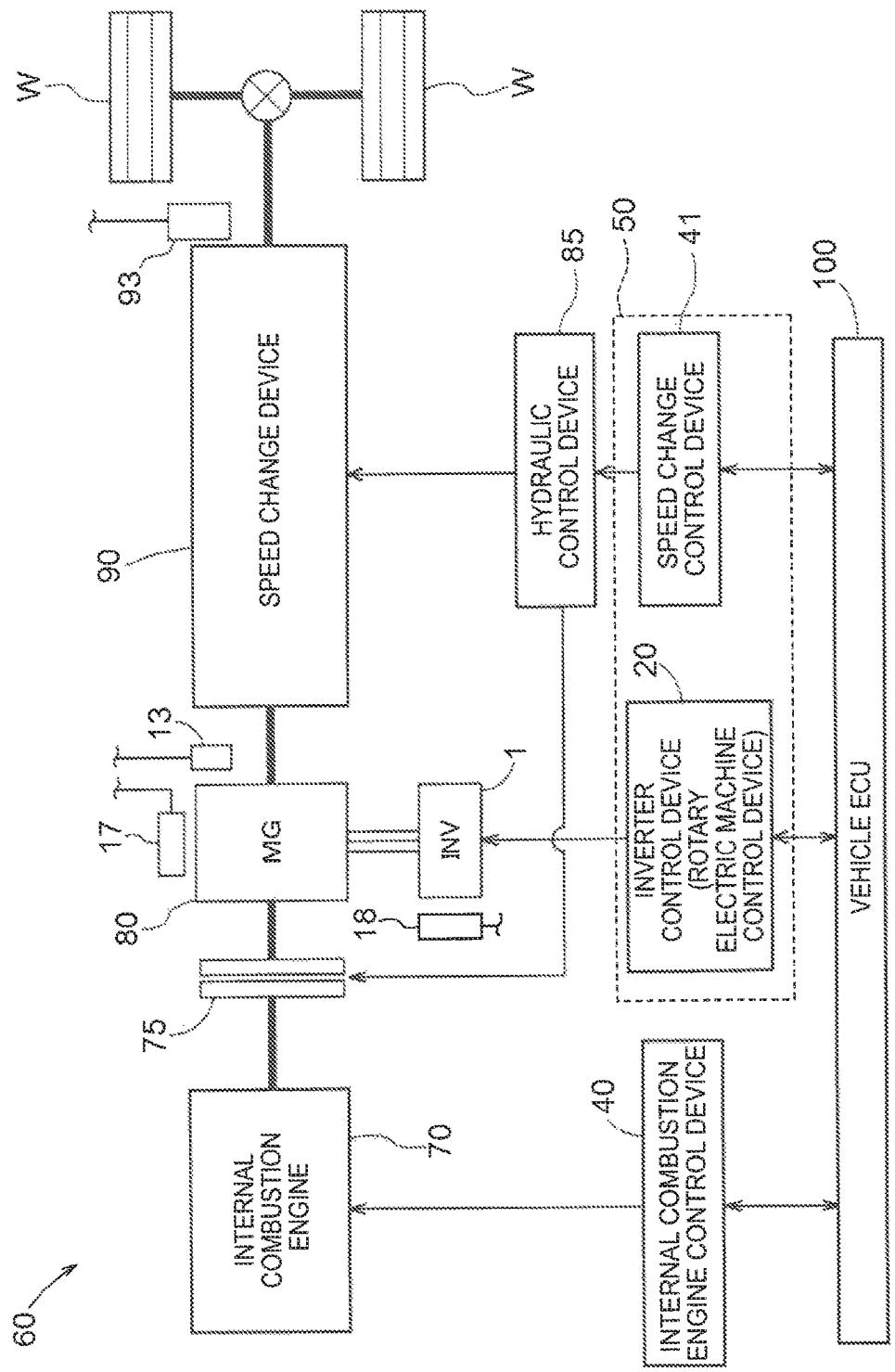
FIG. 14 is a block diagram schematically illustrating the configuration of a vehicle drive device according to a third embodiment.

Next, a vehicle control device according to an embodiment that includes the inverter control device according to the first embodiment or the second embodiment discussed above will be described as a third embodiment. As illustrated in FIG. 14, a vehicle control device 50 controls a vehicle drive device 60 that includes at least the rotary electric machine (MG: Motor/Generator) 80 and the speed change device 90, and the rotary electric machine drive device 1 (INV) which includes the inverter 10 discussed above. Therefore, the vehicle control device 50 is configured to include the inverter control device 20 which controls the rotary electric machine drive device 1. In the embodiment, the vehicle drive device 60 is a hybrid drive device of a so-called parallel type, and includes the internal combustion engine 70 and the rotary electric machine 80 as drive force sources for the wheels W. That is, in the embodiment, the vehicle drive device 60 includes the internal combustion engine 70, the rotary electric machine 80, and the speed change device 90. The internal combustion engine 70 and the rotary electric machine 80 are drivably coupled to each other via the internal combustion engine cut-off clutch 75. As illustrated in FIG. 14, the vehicle drive device 60 includes the internal combustion engine cut-off clutch 75, the rotary electric machine 80, and the speed change device 90, which are provided in the power transfer path which connects the internal combustion engine 70 and the wheels W to each other and which are arranged in this order from the internal combustion engine 70 side. The vehicle control device 50 executes fail-safe speed change control, in which the speed change device 90 is controlled in the direction of lowering the speed ratio, in the case where the active short circuit control (ASC) is executed as the fail-safe control. Features of the vehicle control device 50 according to the embodiment that have not been described above in relation to the first embodiment and the second embodiment will be mainly described below. The same points as those in the first and second embodiments described above will not be specifically described.

In the embodiment, as described above, the speed change device 90 has a stepped speed change mechanism that includes a gear mechanism such as a planetary gear mechanism and a plurality of engagement devices. However, the configuration of the speed change device 90 is not limited thereto. That is, the speed change device 90 is not limited to a speed change mechanism (stepped speed change mechanism) that establishes a plurality of shift speeds in accordance with the engagement state (engaged or disengaged) of a plurality of friction engagement elements and that transfers the rotational speed of an input shaft to an output shaft with the rotational speed changed with the speed ratio of each shift speed. For example, the speed change device 90 may have a speed change mechanism (Continuously Variable Transmission (CVT)) that is capable of continuously varying a speed by passing a belt or a chain between two pulleys (sheaves) to vary the diameter of the pulleys. That is, the speed change device 90 may be of any type as long as the speed change device 90 has a speed change mechanism configured to transfer rotation of an input shaft to an output shaft with the speed of the rotation changed and be capable of changing the speed ratio.

As illustrated in FIG. 14, the vehicle drive device 60 is controlled via an internal combustion engine control device 40, the inverter control device 20, and a speed change control device 41 through integral control (travel control) by the vehicle ECU (Electronic Control Unit) 100 which is one of the highest-level control devices of the vehicle. The internal combustion engine control device 40 controls drive of the internal combustion engine 70, including control of a fuel supply device, an air supply/exhaust mechanism, an ignition device, and so forth (not illustrated). The rotary electric machine 80 is driven via the rotary electric machine drive device 1 which includes the inverter 10 which is connected to a DC power source (the high-voltage battery 11 to be discussed later) and connected to the AC rotary electric machine 80 to perform electric power conversion between DC power and multi-phase AC power. The inverter control device 20 functions as a rotary electric machine control device that controls the rotary electric machine drive device 1. Specifically, the inverter control device 20 performs switching control on the switching elements 3 which constitute the inverter 10 described already with reference to FIG. 1 etc., and controls drive of the rotary electric machine 80. The speed change control device 41 controls the speed change mechanism (not illustrated) of the speed change device 90 via a hydraulic control device 85, for example. In the embodiment, the speed change control device 41 also controls the internal combustion engine cut-off clutch 75 via the hydraulic control device 85.

In this way, the vehicle control device 50 is a control device that controls the vehicle drive device 60 and the rotary electric machine drive device 1. In the embodiment, the vehicle control device (vehicle drive device control device) 50 is constituted of at least the inverter control device 20 and the speed change control device 41. As a matter of course, the vehicle control device 50 may be constituted of the internal combustion engine control device 40, the inverter control device 20, and the speed change control device 41.

In FIG. 14 as well, reference numeral 17 denotes a temperature sensor that detects the temperature of the rotary electric machine 80, and reference numeral 18 denotes a temperature sensor that detects the temperature of the inverter 10 (the temperature of the switching elements 3). The result of detection by the temperature sensors 17 and 18 is transferred to the vehicle control device 50 (the inverter control device 20 and the speed change control device 41). Reference numeral 13 denotes a rotation sensor that detects rotation (such as speed, direction, and angular speed) of a rotor of the rotary electric machine 80, and reference numeral 93 denotes a rotation sensor that detects rotation of the output shaft of the speed change device 90. As with the temperature sensors 17 and 18, the result of detection by the rotation sensors 13 and 93 is transferred to the vehicle control device 50 (the inverter control device 20 and the speed change control device 41). In FIG. 14, a starter device that starts the internal combustion engine 70 and various oil pumps (electrical and mechanical) are not illustrated.

As illustrated in FIG. 1, the inverter control device 20 controls the rotary electric machine drive device 1 which includes the inverter 10, and controls drive of the rotary electric machine 80 via the rotary electric machine drive device 1. As described above, the inverter control device 20 performs switching control on the switching elements 3 which constitute the inverter 10, and executes fail-safe control to be discussed later in the case where a failure has occurred in the rotary electric machine drive device 1.

As discussed above, the inverter control device 20 controls the vehicle drive device 60, which includes the speed change device 90 which is provided in the power transfer path which connects the rotary electric machine 80 which serves as a drive force source for the wheels W of the vehicle and the wheels W to each other, and the rotary electric machine drive device 1, which includes the inverter 10 which is connected to the high-voltage battery 11 and connected to the AC rotary electric machine 80 to perform electric power conversion between DC power and multi-phase AC power. The inverter control device 20 executes speed change control, in which the speed change device 90 is controlled by setting a speed ratio which is the ratio of the rotational speed of the input shaft of the speed change device 90 to the rotational speed of the output shaft of the speed change device 90, and inverter control, in which the switching elements 3 which constitute the inverter 10 are subjected to switching control, and executes the fail-safe control described above in the case where a failure has occurred in the rotary electric machine drive device 1.

Figure 15:
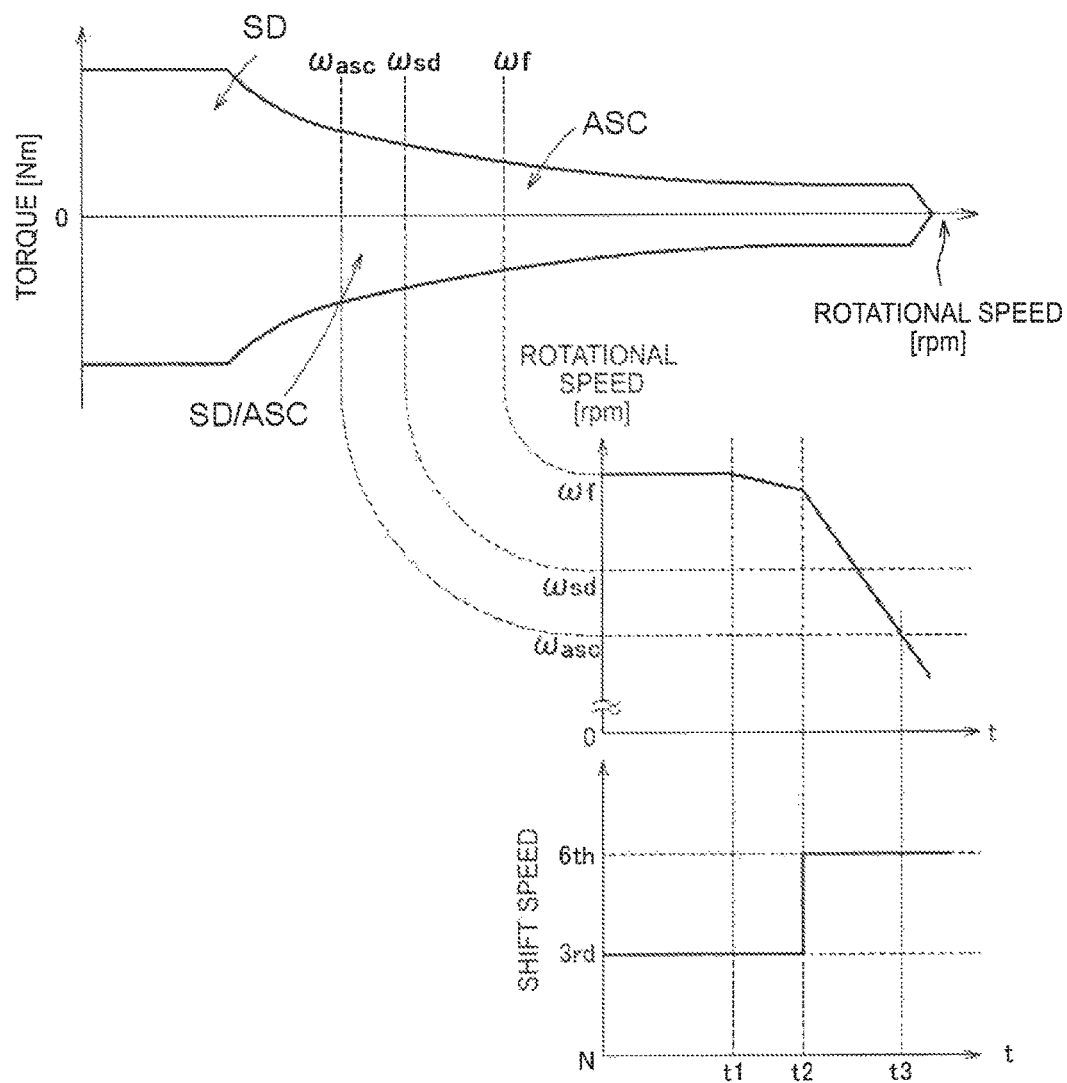
FIG. 15 illustrates the relationship between fail-safe control and fail-safe speed change control according to the third embodiment.

In the case where the active short circuit control is executed as the fail-safe control, the vehicle control device 50 executes the fail-safe speed change control in which the speed change device 90 is controlled in the direction of lowering the speed ratio to lower the rotational speed of the rotary electric machine 80 to the low rotational speed region. FIG. 15 illustrates the relationship between the fail-safe control and the fail-safe speed change control. In the case where a failure has occurred in the rotary electric machine drive device 1 at time t1 at which the rotary electric machine 80 is rotated at a rotational speed "ωf", the vehicle control device 50 (inverter control device 20) executes the active short circuit control as the fail-safe control. Along with the start of the active short circuit control, the rotational speed of the rotary electric machine 80 starts lowering. Now that execution of the active short circuit control as the fail-safe control has been started, the vehicle control device 50 (speed change control device 41) executes the fail-safe speed change control, in which the speed change device 90 is controlled in the direction of lowering the speed ratio (time t2). Here, in order to lower the rotational speed of the rotary electric machine 80 to the low rotational speed region (such that the rotational speed of the rotary electric machine 80 becomes less than the ASC minimum rotational speed $\omega_{asc}$), a speed ratio is set, and a shift speed corresponding to the speed ratio is established. FIG. 15 illustrates an example in which the shift speed is changed from a third speed (3rd) to a sixth speed (6th). When the rotational speed of the rotary electric machine 80 becomes less than the ASC minimum rotational speed $\omega_{asc}$ at time t3, the control scheme of the fail-safe control is caused to transition to the shut-down control.

As discussed above, the inverter control device 20 causes the control scheme of the fail-safe control to transition in accordance with the rotational speed of the rotary electric machine 80 during execution of the fail-safe control (during shifting) or after execution of the fail-safe control (after shifting). For example, if the rotational speed of the rotary electric machine 80 is raised to the high rotational speed region during execution of the shut-down control, the control scheme is caused to transition to the active short circuit control. A case where the rotational speed of the wheels W is raised as the vehicle descends a slope or a step and such a rise in rotational speed is transferred to the rotary electric machine 80 is assumed as a case where the rotational speed of the rotary electric machine 80 becomes higher during execution of the fail-safe control. In the case where the internal combustion engine cut-off clutch 75 is not disengaged, meanwhile, the rotational speed of the rotary electric machine 80 is occasionally raised by transfer of a drive force by the internal combustion engine 70. That is, a case where an accelerator pedal is operated by a passenger corresponds to such an occasion. In the case where some failure has occurred in the vehicle, the passenger has been notified of the occurrence of such a failure. However, if the vehicle is traveling on a highway, for example, there is a possibility that the passenger operates the accelerator pedal in order to stop the vehicle at the nearest service area, rather than on the road shoulder.

Figure 16:
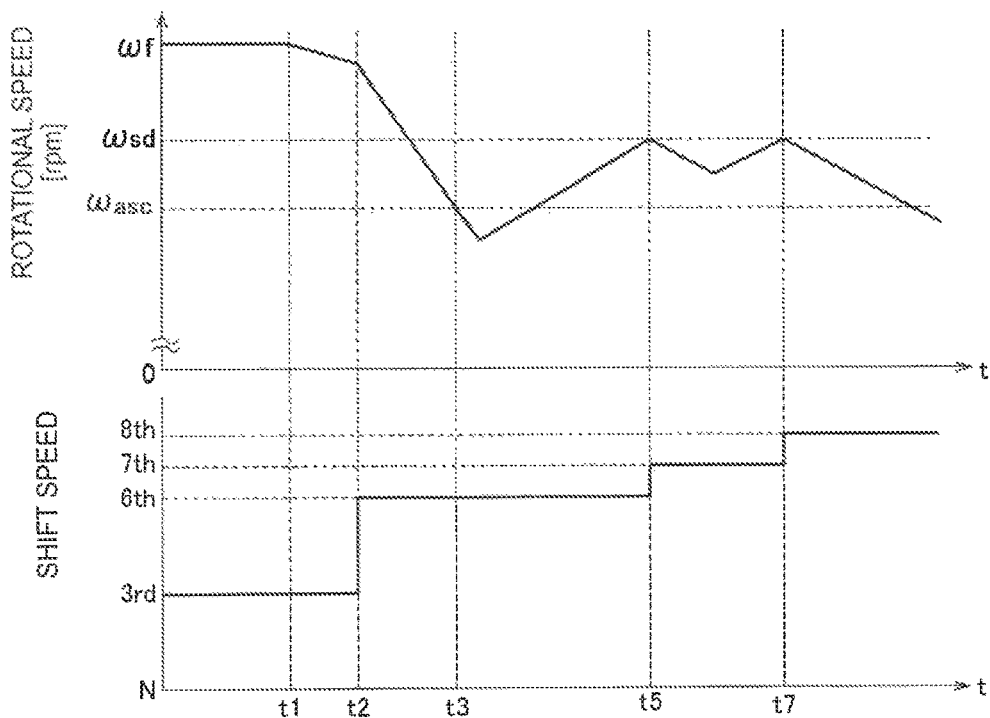
FIG. 16 illustrates an example of a case where the rotational speed is raised during the fail-safe speed change control according to the third embodiment.

In this way, in the case where a transition has been made from the shut-down control to the active short circuit control (or in the case where it is determined that such a transition is to be made) with the rotational speed of the rotary electric machine 80 raised, the speed change device 90 is preferably controlled in the direction of further lowering the speed ratio if the shift speed has not reached the highest speed. FIG. 16 illustrates an example of a case where the rotational speed is raised after execution of the fail-safe speed change control. Variations from time t1 to time t3 are the same as discussed with reference to FIG. 15, and thus are not described. After time t3, that is, after the control scheme is caused to transition to the shut-down control, the rotational speed of the rotary electric machine 80 is raised again. At time t5, the rotational speed of the rotary electric machine 80 reaches the SD maximum rotational speed $\omega_{sd}$, at which the control scheme transitions to the active short circuit control, and is raised to the high rotational speed region. In the case where it is determined that the rotational speed of the rotary electric machine 80 is raised to the high rotational speed region, the vehicle control device 50 executes the fail-safe speed change control to control the speed change device 90 in the direction of further lowering the speed ratio. In the example illustrated in FIG. 16, the shift speed is changed from a sixth speed (6th) to a seventh speed (7th).

When the shift speed is changed from the sixth speed (6th) to the seventh speed (7th), the rotational speed of the rotary electric machine 80 is lowered again. Thus, the rotational speed of the rotary electric machine 80 remains in the low rotational speed region, and the control scheme of the fail-safe control is maintained in the shut-down control, rather than being caused to transition to the active short circuit control. After that, in the case where it is determined that the rotational speed of the rotary electric machine 80 is raised again to the high rotational speed region, the fail-safe speed change control is executed again, and the speed change device 90 is controlled in the direction of further lowering the speed ratio (time t7). In the example illustrated in FIG. 16, the shift speed is changed from a seventh speed (7th) to an eighth speed (8th). As illustrated in FIG. 16, when the shift speed is changed from the seventh speed (7th) to the eighth speed (8th), the rotational speed of the rotary electric machine 80 is lowered again to remain in the low rotational speed region, and the shut-down control is maintained.

Figure 17:
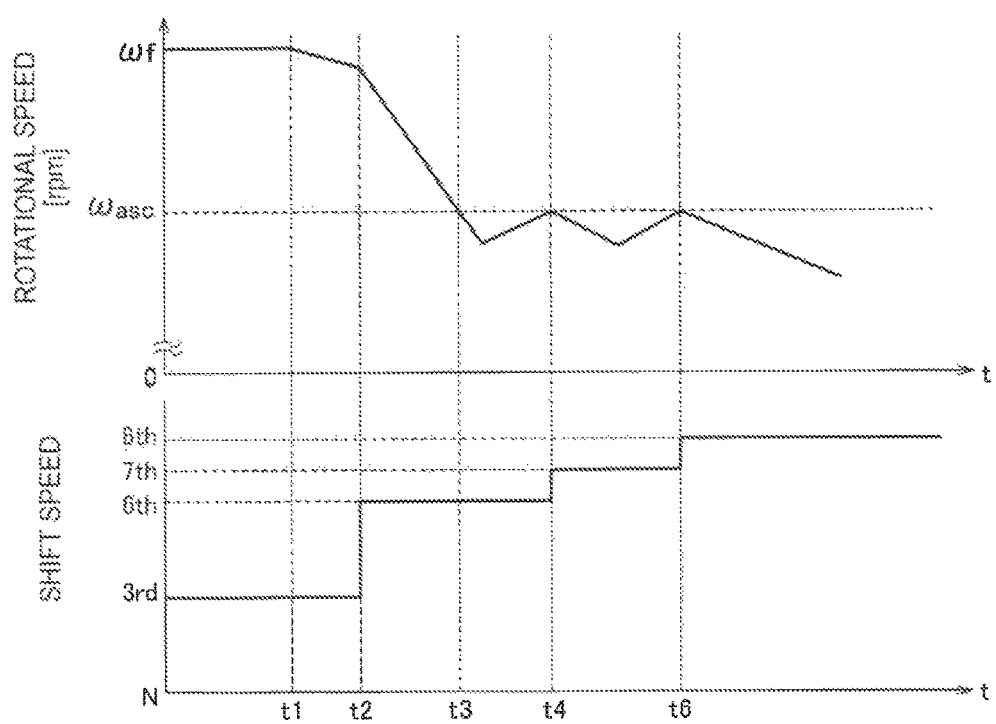
FIG. 17 illustrates another example of a case where the rotational speed is raised during the fail-safe speed change control according to the third embodiment.

In the example illustrated in FIG. 16, as described with reference to FIG. 4, the fail-safe speed change control is executed with a hysteresis section (transition section Tsw) provided between the low rotational speed region and the high rotational speed region. In executing the fail-safe speed change control, however, the speed ratio may be lowered without taking a hysteresis into consideration. FIG. 17 illustrates such a mode in which a hysteresis is not taken into consideration. Variations from time t1 to time t3 are the same as discussed with reference to FIGS. 15 and 16. As in FIG. 16, after time t3, that is, after the control scheme is caused to transition to the shut-down control, the rotational speed of the rotary electric machine 80 is raised again. In the mode of FIG. 16 in which a hysteresis is taken into consideration, a fact that the rotational speed of the rotary electric machine 80 is raised to the high rotational speed region by reaching the SD maximum rotational speed $\omega_{sd}$ at time t5 is used as the determination criterion for execution of the fail-safe speed change control. In the mode of FIG. 17 in which a hysteresis is not taken into consideration, however, a fact that the rotational speed of the rotary electric machine 80 is raised to the ASC minimum rotational speed $\omega_{asc}$ is used as the determination criterion for execution of the fail-safe speed change control.

In the case where the rotational speed of the rotary electric machine 80 starts rising at the same time and at the same rising rate, time t4 at which the rotational speed reaches the ASC minimum rotational speed $\omega_{asc}$ is earlier than time t5 at which the rotational speed reaches the SD maximum rotational speed $\omega_{sd}$. Even if the rotational speed reaches the ASC minimum rotational speed $\omega_{asc}$, the rotational speed has not reached the high rotational speed region, and thus the control scheme is not immediately caused to transition to the active short circuit control. Thus, in the mode of FIG. 17, it is possible to execute the fail-safe speed change control with allowance to lower the speed ratio. In the mode of FIG. 17, although not described in detail, the shift speed is changed from the sixth speed (6th) to the seventh speed (7th) at time t4, and the shift speed is changed from the seventh speed (7th) to the eighth speed (8th) at time t6.

Figure 18:
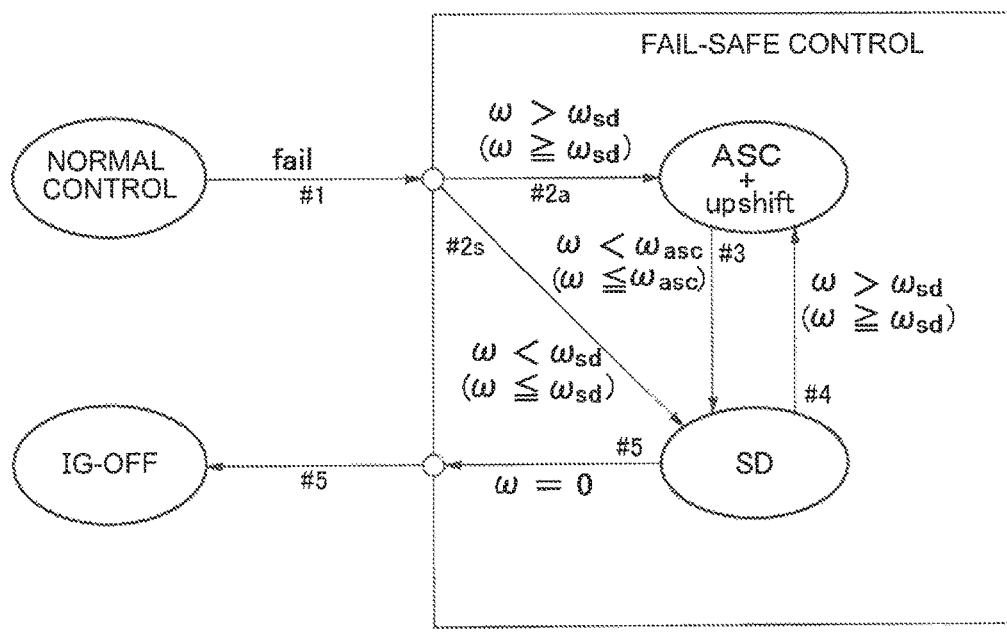
FIG. 18 illustrates state transition during the fail-safe control according to the third embodiment.

The state transition during the fail-safe control according to the embodiment will be described with reference to the state transition diagram of FIG. 18. The normal control in the drawing indicates a state in which normal control is executed with the contactor 9 not brought into an off state and with no failure having occurred in the vehicle, the rotary electric machine 80, the speed change device 90, the inverter 10, or the like. In the case where any failure has occurred in the rotary electric machine drive device 1 during the normal control, information "fail" indicating that a failure has occurred is transferred to the inverter control device 20 (#1). In response to the information "fail", the inverter control device 20 determines the control scheme of the fail-safe control on the basis of the rotational speed of the rotary electric machine 80. In the case where a rotational speed ω is higher than the SD maximum rotational speed $\omega_{sd}$, the active short circuit control (ASC) is selected (#2a). In the case where the rotational speed ω is lower than the SD maximum rotational speed $\omega_{sd}$, on the other hand, the shut-down control (SD) is selected (#2s). That is, at the time of the start of the fail-safe control, a region on the high rotational speed side with respect to the SD maximum rotational speed $\omega_{sd}$ is the high rotational speed region, and a region on the low rotational speed side with reference to the SD maximum rotational speed $\omega_{sd}$ is the low rotational speed region. In the embodiment, in the case where the rotational speed Ca is included in the transition section Tsw, the shut-down control (SD) is selected.

In the embodiment, in the case where the active short circuit control (ASC) is executed as the fail-safe control, the fail-safe speed change control (upshift) in which the speed change device 90 is controlled in the direction of lowering the speed ratio to lower the rotational speed of the rotary electric machine 80 to the low rotational speed region is executed. When the rotational speed ω falls below the ASC minimum rotational speed $\omega_{asc}$ during execution of the active short circuit control (ASC), the control scheme is caused to transition to the shut-down control (SD) (#3). As discussed with reference to FIG. 4, once the active short circuit control (ASC) is executed, a region on the high rotational speed side with reference to the ASC minimum rotational speed $\omega_{asc}$ is the high rotational speed region, and a region on the low rotational speed side with reference to the ASC minimum rotational speed $\omega_{asc}$ is the low rotational speed region. As discussed above with reference to FIGS. 15 to 17, in the case where the active short circuit control (ASC) and the fail-safe speed change control (upshift) are executed (ASC+upshift), the rotational speed of the rotary electric machine 80 is lowered, and the control scheme is caused to transition to the shut-down control (SD).

When the rotational speed ω becomes higher than the SD maximum rotational speed $\omega_{sd}$ during execution of the shut-down control (SD), on the other hand, the control scheme is caused to transition to the active short circuit control (ASC) (#4). In this case, a region on the high rotational speed side with respect to the SD maximum rotational speed $\omega_{sd}$ is the high rotational speed region, and a region on the low rotational speed side with reference to the SD maximum rotational speed $\omega_{sd}$ is the low rotational speed region. As discussed above, a case where the rotational speed of the wheels W is raised as the vehicle descends a slope or a step and such a rise in rotational speed is transferred to the rotary electric machine 80 is assumed as a case where the rotational speed ω becomes higher during execution of the fail-safe control. In the case where the internal combustion engine cut-off clutch 75 is not disengaged, meanwhile, the rotational speed of the rotary electric machine 80 is occasionally raised by transfer of a drive force by the internal combustion engine 70.

Basically, the rotational speed of the rotary electric machine 80 becomes gradually lower as the fail-safe control is continuously executed. Thus, the control scheme converges to the shut-down control (SD). When the rotational speed ω becomes zero during execution of the shut-down control (SD), the inverter control device 20 informs the vehicle ECU 100, which is a higher-level control device, that the rotary electric machine 80 has been stopped safely. The vehicle ECU 100 brings the ignition key (IG key) of the vehicle into an off state (#5: IG-OFF). Alternatively, the vehicle ECU 100 provides a notification to prompt a passenger to operate the ignition key so that the ignition key is operated into an off state by the passenger.

In the case where the fail-safe control is executed, the passenger is notified of a fact that some failure has occurred in the vehicle. When the fail-safe control is executed, as discussed above with reference to FIG. 18, the speed of the vehicle is gradually lowered. It should be noted, however, that the passenger would occasionally like to stop the vehicle to check the failure or wait for rescue after moving the vehicle to a desired location such as a service area on a highway. In this case, it is not preferable if the vehicle is stopped with the rotational speed of the wheels W simply lowered. For example, it is desired that the vehicle should be advanced over some distance using the drive force of the internal combustion engine 70 in which a failure has not occurred. The rotational speed of the wheels W can be kept at a relatively high value with the rotational speed of the rotary electric machine 80 remaining low by executing the fail-safe speed change control. As a result, there is a higher possibility that the passenger can move the vehicle to the desired location. The vehicle can be stopped utilizing a braking device.

The decision of the control scheme of the fail-safe control to be executed in the case where a failure has occurred in the rotary electric machine drive device 1 is not limited to being made on the basis of the rotational speed of the rotary electric machine 80. For example, the control scheme of the fail-safe control may be decided in accordance with the modulation control scheme of the inverter 10. For example, the inverter control device 20 has at least two control modes (modulation schemes), namely pulse width modulation (PWM) control and rectangular-wave control (one-pulse control (1P)), as the mode of the switching pattern (mode of voltage waveform control) for the switching elements 3 which constitute the inverter 10. In addition, the inverter control device 20 has, as the mode of field control for the stator of the rotary electric machine 80, normal field control such as maximum torque control in which maximum torque is output for a current that flows through the stator coils 8 and maximum efficiency control in which the motor is driven at the maximum efficiency for a motor current, and field weakening control (Automatic Field Regulation (AFR) control) in which a field current (field weakening current) is applied to weaken field magnetic flux.

In the embodiment, the inverter control device 20 performs switching control on the inverter 10 in accordance with at least two control modes, namely the pulse width modulation control which is executed along with the normal field control and the rectangular-wave control (one-pulse control (1P)) which is executed along with the field weakening control. In one aspect, the inverter control device 20 can decide the control scheme of the fail-safe control in accordance with the control scheme of the switching control that is being executed when a failure has occurred in the rotary electric machine drive device 1. For example, as illustrated in FIG. 12, the inverter control device 20 executes the active short circuit control (ASC) in the case where a failure has occurred in the rotary electric machine drive device 1 during execution of the rectangular-wave control along with the field weakening control, and executes the shut-down control (SD) in the case where a failure has occurred in the rotary electric machine drive device 1 during execution of the pulse width modulation control. In general, as already described in detail above in relation to the second embodiment, the pulse width modulation control which is executed along with the normal field control is applied in the case where the rotational speed of the rotary electric machine 80 is relatively low, and the rectangular-wave control which is executed along with the field weakening control is applied in the case where the rotational speed of the rotary electric machine 80 is relatively high. Thus, in the broad sense, a configuration in which the control scheme of the fail-safe control is decided on the basis of the modulation control scheme of the inverter 10 can also be considered as a configuration in which the control scheme of the fail-safe control is decided on the basis of the rotational speed of the rotary electric machine 80. The pulse width modulation control and the rectangular-wave control have already been described above in relation to the second embodiment, and thus are not described here.

FIG. 12 illustrates an example of a torque map illustrating the relationship between the rotational speed and torque of the rotary electric machine for this case. In the torque map, symbol B indicates the boundary between the modulation control schemes. B1 and B2 are indicated as the boundary, and are used on the basis of the difference in the DC link voltage Vdc. The boundary B1 indicates a boundary for a case where the DC link voltage Vdc is relatively high compared to the boundary B2. In the embodiment, the boundary B1 indicates a case where the DC link voltage Vdc has a maximum value VH within the rated range, and the boundary B2 indicates a case where the DC link voltage Vdc has a minimum value VL within the rated range. In the case where the DC link voltage Vdc is high, a higher counter electromotive voltage can be withstood, and therefore the pulse width modulation control (PWM) can be executed in a higher rotational speed range. The DC link voltage Vdc is a DC voltage that has been raised in the case where the DC/DC converter 2 is provided, and corresponds to the voltage of the high-voltage battery 11 in the case where the DC/DC converter 2 is not provided.

In the case where the control scheme of the fail-safe control has been selected in accordance with the modulation control scheme of the inverter 10, the inverter control device 20 causes the control scheme of the fail-safe control to transition from a control scheme that is being executed to another control scheme, during execution of the selected control scheme, on the basis of the rotational speed of the rotary electric machine 80. The mode of the transition is the same as the mode discussed above with reference to FIG. 4, and thus is not described in detail. That is, the inverter control device 20 causes the control scheme of the fail-safe control to transition in accordance with the rotational speed of the rotary electric machine 80 during execution of the shut-down control. Specifically, in the case where the rotational speed of the rotary electric machine 80 is raised to be equal to or more than the SD maximum rotational speed cu (raised to the high rotational speed region) during execution of the shut-down control, the inverter control device 20 causes the control scheme to transition to the active short circuit control. In the case where the rotational speed of the rotary electric machine 80 is lowered to be equal to or less than the ASC minimum rotational speed c, (lowered to the low rotational speed region) during execution of the active short circuit control, on the other hand, the inverter control device 20 causes the control scheme to transition to the shut-down control.

Regions on the high rotational speed side and the low rotational speed side with respect to the boundary B1 and the boundary B2 may be referred to as the "high rotational speed region" and the "low rotational speed region", respectively. That is, when a failure has occurred in the rotary electric machine drive device 1, the control scheme of the fail-safe control can be decided in accordance with the high rotational speed region and the low rotational speed region which are set on the basis of the boundary B1 and the boundary B2. During execution of the fail-safe control, the control scheme of the fail-safe control can be caused to transition in accordance with the high rotational speed region and the low rotational speed region which are set on the basis of the SD maximum rotational speed $\omega_{sd}$ and the ASC minimum rotational speed $\omega_{asc}$.

Figure 19:
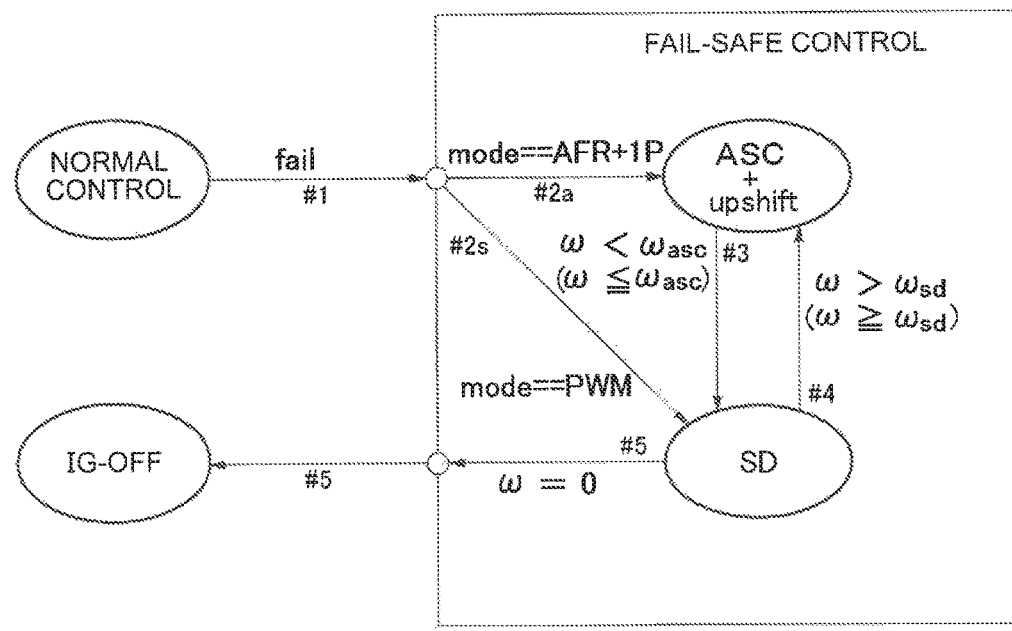
FIG. 19 illustrates state transition during the fail-safe control according to the third embodiment.

FIG. 19 illustrates state transition for a case where the control scheme of the fail-safe control is decided on the basis of the modulation control. When the inverter control device 20 receives information "fail" indicating that some failure has occurred in the rotary electric machine drive device 1 in step #1, the inverter control device 20 determines the control scheme of the fail-safe control on the basis of the modulation control scheme of the inverter 10. In the case where the modulation control scheme is the rectangular-wave control (AFR+1 P), the active short circuit control (ASC) is selected (#2a). In the case where the modulation control scheme is the pulse width modulation control (PWM), on the other hand, the shut-down control (SD) is selected (#2s). The contents other than the conditions for deciding the control scheme in step #2a and step #2b are the same as those discussed above with reference to FIG. 18, and thus are not described in detail. In addition, the idea for setting the SD maximum rotational speed $\omega_{sd}$ and the ASC minimum rotational speed $\omega_{asc}$ is the same as that described above in relation to the first embodiment, and thus is not described here.

As described above, the minimum rotational speed (ASC minimum rotational speed $\omega_{asc}$) at which execution of the active short circuit control is allowed is preferably set to a rotational speed at which a phase current that flows during execution of the active short circuit control is less than the maximum value in the range of a current in which the magnetic force of a permanent magnet of the rotary electric machine 80 can be held at the maximum temperature at which the rotary electric machine 80 is operable. In view of this condition, a condition of the temperature of the rotary electric machine 80 can be added to the condition for executing the fail-safe speed change control. That is, if a rise in temperature of the rotary electric machine 80 due to execution of the active short circuit control is allowable, the active short circuit control can be continued without problem. Thus, it is not necessary to hastily cause the control scheme of the fail-safe control to transition to the shut-down control, or to execute the fail-safe speed change control. Thus, the condition for executing the fail-safe speed change control is preferably determined as follows. That is, the fail-safe speed change control can be executed in the case where the active short circuit control is executed as the fail-safe control and the temperature of the rotary electric machine 80 is equal to or more than a regulation temperature prescribed in advance. The regulation temperature is set on the basis of various types of values obtained through an experiment or a simulation, specifically the time before a temperature at which the magnetic force of a permanent magnet is degraded is reached, the temperature rise per unit time, an error range of a temperature sensor, a current value, and so forth, as discussed above.

4. Overview of Above Embodiments

The overview of the inverter control device (20) and the vehicle control device (50) described above will be described below.

There is provided an inverter control device (20) that controls a rotary electric machine drive device (1) that includes an inverter (10), the inverter control device (20) being configured to perform switching control on switching elements (3) that constitute the inverter (10) and to execute fail-safe control in the case where a failure has occurred in the rotary electric machine drive device, in which:

the inverter (10) is connected to a DC power source (11) and connected to an AC rotary electric machine (80) drivably coupled to wheels (W) of a vehicle to perform electric power conversion between DC power and multi-phase AC power, a series circuit including an upper switching element (31) and a lower switching element (32) constitutes an arm for one phase of the AC power, the inverter (10) including a freewheeling diode (5) connected in parallel with each of the switching elements (3) with a direction from a lower side toward an upper side defined as a forward direction;

active short circuit control (ASC) and shut-down control (SD), in which all the switching elements (3) are brought into an off state, are selectively executed in the fail-safe control, the active short circuit control (ASC) being either upper-side active short circuit control, in which the upper switching elements (31) of the arms for all the multiple phases are brought into an on state, or lower-side active short circuit control, in which the lower switching elements (32) of the arms for all the multiple phases are brought into an on state; and the active short circuit control (ASC) is executed in a high rotational speed region, and the shut-down control (SD) is executed in a low rotational speed region, which is on a low rotational speed side with respect to the high rotational speed region, in accordance with at least a rotational speed of the rotary electric machine (80).

The counter electromotive force of the rotary electric machine (80) becomes larger in accordance with the rotational speed of the rotary electric machine (80). Therefore, in the case where the shut-down control (SD) is executed, the DC power source current (Ib), which flows through the DC power source (11) for charging, and the DC link voltage (Vdc), which is a voltage on the DC side of the inverter (10), tend to be increased in accordance with the rotational speed. Meanwhile, the active short circuit control (ASC) has constraints that the rotary electric machine (80) occasionally generates large negative torque in the case where the active short circuit control (ASC) is executed at a low rotational speed and that the rotary electric machine (80) generates a large amount of heat in the case where the active short circuit control is executed for a long time. However, the energy possessed by the stator coils (8) of the rotary electric machine (80) does not flow into the DC power source (11) as a current for charging, but is circulated between the stator coils (8) and the inverter (10). Therefore, in the active short circuit control (ASC), the DC link voltage (Vdc) is not raised.

With the present configuration, in the high rotational speed region in which the rotational speed of the rotary electric machine (80) is relatively high, the active short circuit control (ASC) is selected as the fail-safe control. Thus, an increase in the DC power source current (Ib) which flows through the DC power source (11) and a rise in the DC link voltage (Vdc) are suppressed. When the active short circuit control (ASC) is executed, meanwhile, negative torque is generated by the rotary electric machine (80), and therefore the rotary electric machine (80) which is rotated in the high rotational speed region can be decelerated. In addition, a circulating current due to the active short circuit control (ASC) raises the temperature of the stator coils of the rotary electric machine (80), which may demagnetize the permanent magnet depending on the temperature reached. According to the experiment and the simulation by the inventors, a maximum peak current (absolute value) of a steady current and a transient current is small in a region in which the rotational speed is relatively high compared to a region in which the rotational speed is relatively low (see FIG. 11, for example). Thus, when the active short circuit control (ASC) is executed in the high rotational speed region, the magnetic force of the permanent magnet of the rotary electric machine (80) can be held even if a temperature rise is caused by the circulating current. In the low rotational speed region in which the rotational speed of the rotary electric machine (80) is relatively low, on the other hand, the shut-down control (SD) is selected as the fail-safe control. Thus, it is possible to suppress generation of large negative torque by the rotary electric machine (80), and to shorten the period for which the active short circuit control (ASC) is executed. In the low rotational speed region, in addition, the amount of increase in DC power source current (Ib) and DC link voltage (Vdc) due to the shut-down control (SD) is suppressed within an appropriate range. In this way, with the present configuration, it is possible to appropriately execute the fail-safe control while suppressing an excessive increase in DC power source current (Ib) for charging the DC power source or DC link voltage (Vdc) in the case where a failure has occurred in the rotary electric machine drive device (1) which includes the inverter (10).

The rotational speed of the rotary electric machine (80) is occasionally varied during execution of the fail-safe control. For example, in the case where the vehicle is descending a slope, the rotational speed of the rotary electric machine (80) which is drivably coupled to the wheels (W) is occasionally raised. If the rotational speed of the rotary electric machine (80) is raised in the case where it is determined that an increase in DC power source current (Ib) for charging the DC power source (11) or DC link voltage (Vdc) is suppressed within an appropriate range and the shut-down control (SD) is executed, the DC power source current (Ib) or the DC link voltage (Vdc) may be raised to exceed the appropriate range. Thus, in one aspect, preferably, in the case where the rotational speed of the rotary electric machine (80) is raised to the high rotational speed region during execution of the shut-down control (SD), the inverter control device (20) causes a control scheme to transition to the active short circuit control (ASC).

In the case where an additional drive force, including an external force such as a gravitational force, is not provided to the wheels (W), the rotational speed of the rotary electric machine (80) is lowered during execution of the fail-safe control. In the active short circuit control (ASC), a current is circulated between the stator coils (8) and the inverter (20), and therefore much of the energy is consumed as heat in the stator coils (8) and the inverter (20). The stator coils (8) and the switching elements (3) may be worn by the heat. In addition, when the stator coils (8) are heated, the temperature of the stator may be raised to demagnetize the permanent magnet. In the case where the active short circuit control (ASC) is executed at a low rotational speed, the rotary electric machine (80) occasionally generates large negative torque. The negative torque may serve as deceleration and make the passenger of the vehicle feel variations in behavior. Therefore, circulation of a current due to the active short circuit control (ASC) is preferably ended at an appropriate timing. Thus, in one aspect, preferably, in the case where the rotational speed of the rotary electric machine (80) is lowered to the low rotational speed region during execution of the active short circuit control (ASC), a control scheme is caused to transition to the shut-down control (SD).

In the case where the inverter (80) is connected to the DC power source (11) via the power source switch (9) which blocks the supply of electric power in an off state, regenerative power charges the DC power source (11) when the power source switch (9) is in an on state. When the power source switch (9) is in an off state, on the other hand, the connection with the DC power source (11) is blocked, and therefore regenerative power raises the DC link voltage (Vdc). Therefore, the rotational speed of the rotary electric machine (80), which serves as a criterion for selecting the control scheme from the active short circuit control (ASC) and the shut-down control (SD), is preferably set in accordance with the on/off state of the power source switch (9). That is, in one aspect, preferably, the inverter (80) is connected to the DC power source (11) via a power source switch (9) that blocks supply of electric power in an off state; and a maximum rotational speed ($\omega_{sd}$) at which execution of the shut-down control (SD) is allowed is set to a rotational speed at which a DC power source current (Ib) and regenerative power that match the rotational speed of the rotary electric machine (80) are less than allowable maximum rated values in accordance with a DC power source voltage in the case where the power source switch (9) is in an on state. In addition, preferably, the maximum rotational speed ($\omega_{sd}$) is set to a rotational speed at which a peak value of a counter electromotive force among lines for three phases is less than a maximum rated voltage allowed in the rotary electric machine drive device (1) in the case where the power source switch (9) is in an off state.

In the case where the DC power source voltage which is the voltage of the DC power source (11) has a lower limit value within the rated range, the potential difference from the voltage generated by the rotary electric machine (80) tends to become larger, and the DC power source current (Ib) and regenerative power also tend to become larger. Thus, as discussed above, preferably, in the case where the power source switch (9) is in an on state, the maximum rotational speed ($\omega_{sd}$) is set on the basis of the characteristics of the DC power source current (Ib) and regenerative power with respect to the rotational speed of the regenerative power (80) for a case where the DC power source voltage has a lower limit value within the rated range.

Preferably, in the case where the power source switch (9) is in an off state, the maximum rotational speed ($\omega_{sd}$) is further set such that a voltage of a smoothing capacitor (4) that is raised by a charge supplied from the rotary electric machine (80) during execution of the shut-down control (SD) is less than an allowable maximum value in accordance with a capacity of the smoothing capacitor (4), the smoothing capacitor being configured to smooth a DC link voltage (Vdc) which is a voltage on a DC side of the inverter (10). In general, the smoothing capacitor (4) is often provided on the DC side of the inverter (10). In the case where the power source switch (9) is in an off state, a current for charging the DC power source (11) is blocked, and therefore the current charges the smoothing capacitor (4), and raises the DC link voltage (Vdc). The withstanding voltage of the smoothing capacitor (4) is often the lowest among electronic components that constitute the rotary electric machine drive device (1). If the capacity of the smoothing capacitor (4) is reduced in order to reduce the size etc. of the rotary electric machine drive device (1), in addition, the speed at which the voltage across the terminals of the smoothing capacitor (4) (i.e. the DC link voltage (Vdc)) is raised tends to be increased. Thus, the maximum rotational speed ($\omega_{sd}$) is preferably set in accordance with an allowable value of the smoothing capacitor (4) as discussed above.

In the case where the active short circuit control (ASC) is executed, negative torque is generated by the rotary electric machine (80), and the negative torque is transferred to the wheels (W) which are drivably coupled to the rotary electric machine (80). The negative torque acts as a braking force, and makes the passenger of the vehicle feel negative acceleration. Such acceleration is preferably suppressed to such a degree that the passenger does not feel uncomfortable. Thus, in one aspect, preferably, a minimum rotational speed ($\omega_{asc}$) at which execution of the active short circuit control (ASC) is allowed is set to a rotational speed at which an absolute value of negative torque transferred to the wheels (W) during execution of the active short circuit control (ASC) is less than an absolute value of maximum allowable negative torque prescribed in advance.

As discussed above, in the active short circuit control (ASC), a current is circulated between the stator coils (8) and the inverter (20), and therefore much of the energy is consumed as heat in the stator coils (8) and the inverter (20). When the temperature of the rotary electric machine (80) is raised by the heat, the permanent magnet which is provided in the rotary electric machine (80) may be demagnetized. Therefore, it is necessary that the temperature of the rotary electric machine (80) should be suppressed within the range in which the magnetic force of the permanent magnet can be held. The rise in temperature is ascribable to the circulating current, and thus it is necessary that the current should be suppressed within an appropriate range. Although the phase current which flows during the active short circuit includes a steady current and a transient current, the current to be suppressed is an instantaneous peak current (absolute value) that includes a steady current and a transient current. In one aspect, preferably, a minimum rotational speed ($\omega_{asc}$) at which execution of the active short circuit control (ASC) is allowed is set to a rotational speed at which a phase current that flows during execution of the active short circuit control (ASC) is less than a maximum value in a range of a current in which a magnetic force of a permanent magnet of the rotary electric machine (80) can be held at a maximum temperature at which the rotary electric machine (80) is operable.

There is provided an inverter control device (20) that controls a rotary electric machine drive device (1) that includes an inverter (10), the inverter control device (20) being configured to perform switching control on switching elements (3) that constitute the inverter (10) and to execute fail-safe control in the case where a failure has occurred in the rotary electric machine drive device, in which:

the inverter (10) is connected to a DC power source (11) and connected to an AC rotary electric machine (80) drivably coupled to wheels (W) of a vehicle to perform electric power conversion between DC power and multi-phase AC power, a series circuit including an upper switching element (31) and a lower switching element (32) constitutes an arm for one phase of the AC power, the inverter (10) including a freewheeling diode (5) connected in parallel with each of the switching elements (3) with a direction from a lower side toward an upper side defined as a forward direction;

at least two modulation control schemes including pulse width modulation control (PWM) and rectangular-wave control (AFR+1P) are selectively executed, the pulse width modulation control (PWM) being a control scheme in which a plurality of pulses with different duties are output in one cycle of electrical angle, and the rectangular-wave control (AFR+1P) being a control scheme which is performed along with field weakening control, in which regulation is performed in a direction of weakening a field of the rotary electric machine (80), and in which one pulse is output in one cycle of electrical angle;

active short circuit control (ASC) and shut-down control (SD), in which all the switching elements (3) are brought into an off state, are selectively executed in the fail-safe control, the active short circuit control (ASC) being either upper-side active short circuit control, in which the upper switching elements (31) of the arms for all the multiple phases are brought into an on state, or lower-side active short circuit control, in which the lower switching elements (32) of the arms for all the multiple phases are brought into an on state; and the active short circuit control (ASC) is executed in the case where a failure has occurred in the rotary electric machine drive device (1) during execution of the rectangular-wave control (AFR+1P), and the shut-down control (SD) is executed in the case where a failure has occurred in the rotary electric machine drive device (1) during execution of the pulse width modulation control (PWM).

The rectangular-wave control (AFR+1P) is executed in a region in which the rotational speed of the rotary electric machine (80) is relatively high, and the pulse width modulation control (PWM) is executed in a region in which the rotational speed of the rotary electric machine (80) is relatively low compared to the rectangular-wave control (AFR+1P). With the present configuration, in the case where a failure has occurred in the rotary electric machine drive device (1) during execution of the rectangular-wave control (AFR+1P), the active short circuit control (ASC) is selected as the fail-safe control. Thus, an increase in the DC power source current (Ib) which flows through the DC power source (11) and a rise in the DC link voltage (Vdc) are suppressed. When the active short circuit control (ASC) is executed, negative torque is generated by the rotary electric machine (80), and therefore the rotary electric machine (80) which is rotated in a relatively high rotational speed region can be decelerated. Meanwhile, a circulating current due to the active short circuit control (ASC) raises the temperature of the stator coils of the rotary electric machine (80), which may demagnetize the permanent magnet depending on the temperature reached. According to the experiment and the simulation by the inventors, a maximum peak current (absolute value) of a steady current and a transient current is small in a region in which the rotational speed is relatively high compared to a region in which the rotational speed is relatively low (see FIG. 11, for example). Thus, when the active short circuit control (ASC) is executed in a relatively high rotational speed region, the magnetic force of the permanent magnet of the rotary electric machine (80) can be held even if a temperature rise is caused by the circulating current. On the other hand, the shut-down control (SD), which may cause an increase in DC power source current (Ib) or a rise in DC link voltage (Vdc), is selected in the case where a failure has occurred in the rotary electric machine drive device (1) during execution of the pulse width modulation control (PWM). Thus, it is possible to suppress generation of large negative torque by the rotary electric machine (80), and to shorten the period for which the active short circuit control (ASC) is executed. During execution of the pulse width modulation control (PWM), in addition, the rotational speed of the rotary electric machine (80) is relatively low, and therefore the amount of increase in DC power source current (Ib) or DC link voltage (Vdc) due to the shut-down control (SD) is suppressed within an appropriate range. In this way, with the present configuration, it is possible to appropriately execute the fail-safe control while suppressing an excessive increase in DC power source current (Ib) or DC link voltage (Vdc) in the case where a failure has occurred in the rotary electric machine drive device (1) which includes the inverter (10).

Preferably, during execution of one of the active short circuit control (ASC) and the shut-down control (SD) which has been selected in accordance with the modulation control scheme, the inverter control device (20) causes the control scheme of the fail-safe control to transition to the other of the active short circuit control (ASC) and the shut-down control (SD) on the basis of a rotational speed of the rotary electric machine (80). The rotational speed of the rotary electric machine (80) is varied also during execution of the fail-safe control. The magnitude of the counter electromotive force differs in accordance with the rotational speed. Thus, the control scheme is preferably caused to transition to an appropriate control scheme in accordance with the rotational state of the rotary electric machine (80) even if the control is being executed in accordance with the once selected control scheme. It should be noted, however, that normal modulation control is not executed after the fail-safe control is started. Thus, the control scheme of the fail-safe control cannot be selected again on the basis of the modulation control scheme. Meanwhile, the counter electromotive force of the rotary electric machine (80) depends on the rotational speed of the rotary electric machine (80). Thus, the control scheme of the fail-safe control is preferably selected on the basis of the rotational speed of the rotary electric machine (80) after one of the active short circuit control (ASC) and the shut-down control (SD) is started.

As discussed above, the rotational speed of the rotary electric machine (80) is occasionally varied during execution of the fail-safe control. For example, in the case where the vehicle is descending a slope, the rotational speed of the rotary electric machine (80) which is drivably coupled to the wheels (W) is occasionally raised. If the rotational speed of the rotary electric machine (80) is raised in the case where it is determined that an increase in DC power source current (Ib) or DC link voltage (Vdc) is suppressed within an appropriate range and the shut-down control (SD) is executed, the DC power source current (Ib) or the DC link voltage (Vdc) may be raised to exceed the appropriate range. Thus, in one aspect, preferably, the inverter (10) is connected to the DC power source (11) via a power source switch (9) that blocks supply of electric power in an off state; and in the case where the rotational speed of the rotary electric machine (80) is raised to be equal to or more than a maximum rotational speed ($\omega_{sd}$) at which execution of the shut-down control (SD) is allowed during execution of the shut-down control (SD), the inverter control device (20) causes the control scheme to transition to the active short circuit control (ASC). Preferably, the maximum rotational speed (($\omega$) is set to a rotational speed at which a DC power source current (Ib) and regenerative power that match the rotational speed of the rotary electric machine (80) are less than allowable maximum rated values in accordance with a DC power source voltage in the case where the power source switch (9) is in an on state. In addition, preferably, the maximum rotational speed ($\omega_{sd}$) is set to a rotational speed at which a peak value of a counter electromotive force among lines for three phases is less than a maximum rated voltage allowed in the rotary electric machine drive device (1) in the case where the power source switch (9) is in an off state.

The inverter (80) is connected to the DC power source (11) via the power source switch (9), and therefore regenerative power charges the DC power source (11) when the power source switch (9) is in an on state. When the power source switch (9) is in an off state, the connection with the DC power source (11) is blocked, and therefore regenerative power raises the DC link voltage (Vdc). Therefore, the rotational speed of the rotary electric machine (80), which serves as a criterion for selecting the control scheme of the fail-safe control, is preferably set in accordance with the on/off state of the power source switch (9). In the case where the DC power source voltage which is the voltage of the DC power source (11) has a lower limit value within the rated range, the potential difference from the voltage generated by the rotary electric machine (80) tends to become larger, and the DC power source current (Ib) and regenerative power also tend to become larger. Thus, as discussed above, preferably, in the case where the power source switch (9) is in an on state, the maximum rotational speed ($\omega_{sd}$) is set on the basis of the characteristics of the DC power source current (Ib) and regenerative power with respect to the rotational speed of the regenerative power (80) for a case where the DC power source voltage has a lower limit value within the rated range.

Preferably, in the case where the power source switch (9) is in an off state, the maximum rotational speed ($\omega_{sd}$) is further set such that a voltage of a smoothing capacitor (4) that is raised by a charge supplied from the rotary electric machine (80) during execution of the shut-down control (SD) is less than an allowable maximum value in accordance with a capacity of the smoothing capacitor (4), the smoothing capacitor being configured to smooth a DC link voltage (Vdc) which is a voltage on a DC side of the inverter (10). In general, the smoothing capacitor (4) is often provided on the DC side of the inverter (10). In the case where the power source switch (9) is in an off state, a current for charging the DC power source (11) is blocked, and therefore the current charges the smoothing capacitor (4), and raises the DC link voltage (Vdc). The withstanding voltage of the smoothing capacitor (4) is often the lowest among electronic components that constitute the rotary electric machine drive device (1). If the capacity of the smoothing capacitor (4) is reduced in order to reduce the size etc. of the rotary electric machine drive device (1), in addition, the speed at which the voltage across the terminals of the smoothing capacitor (4) (i.e. the DC link voltage (Vdc)) is raised tends to be increased. Thus, the maximum rotational speed ($\omega_{sd}$) is preferably set in accordance with an allowable value of the smoothing capacitor (4) as discussed above.

In the case where an additional drive force, including an external force such as a gravitational force, is not provided to the wheels (W), the rotational speed of the rotary electric machine (80) is lowered during execution of the fail-safe control. In the active short circuit control (ASC), a current is circulated between the stator coils (8) and the inverter (20), and therefore much of the energy is consumed as heat in the stator coils (8) and the inverter (20). The stator coils (8) and the switching elements (3) may be worn by the heat.

In addition, when the stator coils (8) are heated, the temperature of the stator may be raised to demagnetize the permanent magnet. In the case where the active short circuit control (ASC) is executed at a low rotational speed, the rotary electric machine (80) occasionally generates large negative torque. The negative torque may serve as deceleration and make the passenger of the vehicle feel variations in behavior. Therefore, circulation of a current due to the active short circuit control (ASC) is preferably ended at an appropriate timing. Thus, in one aspect, preferably, in the case where the rotational speed of the rotary electric machine (80) is lowered to be equal to or less than a minimum rotational speed ($\omega_{asc}$) at which execution of the active short circuit control (ASC) is allowed during execution of the active short circuit control (ASC), the control scheme is caused to transition to the shut-down control (SD).

When the value of the DC link voltage (Vdc) differs, the boundary (B) at which the modulation control scheme is changed also differs. The maximum rotational speed ($\omega_{sd}$) and the minimum rotational speed ($\omega_{asc}$) are set in conjunction with the boundary (B). Thus, the determination criteria (the maximum rotational speed ($\omega_{sd}$) and the minimum rotational speed ($\omega_{asc}$)) for changing the control scheme of the fail-safe control after the fail-safe control is started preferably also correspond to the DC link voltage (Vdc). That is, in one aspect, preferably, in the case where the rotational speed of the rotary electric machine (80) is raised to be equal to or more than a maximum rotational speed ($\omega_{sd}$) at which execution of the shut-down control (SD) is allowed during execution of the shut-down control (SD), the control scheme is caused to transition to the active short circuit control (ASC); in the case where the rotational speed of the rotary electric machine (80) is lowered to be equal to or less than a minimum rotational speed ($\omega_{asc}$) at which execution of the active short circuit control (ASC) is allowed during execution of the active short circuit control (ASC), the control scheme is caused to transition to the shut-down control (SD); and the maximum rotational speed ($\omega_{sd}$) and the minimum rotational speed ($\omega_{asc}$) are set in accordance with a DC link voltage (Vdc) which is a voltage on a DC side of the inverter (10), and set to smaller values as the DC link voltage (Vdc) is lower.

In the case where the active short circuit control (ASC) is executed, negative torque is generated by the rotary electric machine (80), and the negative torque is transferred to the wheels (W) which are drivably coupled to the rotary electric machine (80). The negative torque acts as a braking force, and makes the passenger of the vehicle feel negative acceleration. Such acceleration is preferably suppressed to such a degree that the passenger does not feel uncomfortable. Thus, in one aspect, preferably, a minimum rotational speed ($\omega_{asc}$) at which execution of the active short circuit control (ASC) is allowed is set to a rotational speed at which an absolute value of negative torque transferred to the wheels (W) during execution of the active short circuit control (ASC) is less than an absolute value of maximum allowable negative torque prescribed in advance.

As discussed above, in the active short circuit control (ASC), a current is circulated between the stator coils (8) and the inverter (20), and therefore much of the energy is consumed as heat in the stator coils (8) and the inverter (20). When the temperature of the rotary electric machine (80) is raised by the heat, the permanent magnet which is provided in the rotary electric machine (80) may be demagnetized. Therefore, it is necessary that the temperature of the rotary electric machine (80) should be suppressed within the range in which the magnetic force of the permanent magnet can be held. The rise in temperature is ascribable to the circulating current, and thus it is necessary that the current should be suppressed within an appropriate range. Although the phase current which flows during the active short circuit includes a steady current and a transient current, the current to be suppressed is an instantaneous peak current that includes a steady current and a transient current. In one aspect, preferably, the minimum rotational speed ($\omega_{asc}$) at which execution of the active short circuit control (ASC) is allowed is set to a rotational speed at which a phase current that flows during execution of the active short circuit control (ASC) is less than a maximum value in a range of a current in which a magnetic force of a permanent magnet of the rotary electric machine (80) can be held at a maximum temperature at which the rotary electric machine (80) is operable.

The inverter control device (20) described above may also be applied to a vehicle control device (50). In this case, there is provided a vehicle control device (50) that controls a vehicle drive device (60) and a rotary electric machine drive device (1) and that includes the inverter control device (20) described above, the vehicle drive device (60) including a speed change device (90) provided in a power transfer path that connects a rotary electric machine (80) that serves as a drive force source for wheels (W) of a vehicle and the wheels (W) to each other, and the rotary electric machine drive device (1) including an inverter (10), in which:

the vehicle control device (50) executes speed change control in which the speed change device (90) is controlled by setting a speed ratio which is a ratio of a rotational speed of an input shaft of the speed change device (90) to a rotational speed of an output shaft of the speed change device (90), inverter control in which the switching elements (3) which constitute the inverter (10) are subjected to switching control, and fail-safe speed change control (upshift) in which the speed change device (90) is controlled in a direction of lowering the speed ratio in the case where the active short circuit control (ASC) is executed as the fail-safe control.

With this configuration, in the high rotational speed region in which the rotational speed of the rotary electric machine (80) is relatively high or during execution of the rectangular-wave control in the case where a failure has occurred in the rotary electric machine drive device (1), the active short circuit control (ASC) is selected as the fail-safe control. Thus, an increase in the DC power source current (Ib) which flows through the DC power source (11) and a rise in the DC link voltage (Vdc) are suppressed. When the active short circuit control (ASC) is executed, negative torque is generated by the rotary electric machine (80), and therefore the rotary electric machine (80) which is rotated in the high rotational speed region is decelerated. In the low rotational speed region in which the rotational speed of the rotary electric machine (80) is relatively low or during execution of the pulse width modulation control in the case where a failure has occurred in the rotary electric machine drive device (1), on the other hand, the shut-down control (SD) is selected as the fail-safe control. In the case where the active short circuit control (ASC) is executed, further, the fail-safe speed change control (upshift) is executed. Consequently, it is possible to suppress a reduction in speed of the wheels (W) while lowering the rotational speed of the rotary electric machine (80). Thus, there is a higher possibility that the passenger can move and stop the vehicle at a desired location such as a service area, for example, even in a situation in which the rotary electric machine (80) cannot be utilized as a drive source. In addition, the rotational speed of the rotary electric machine (80) is lowered by lowering the speed ratio by executing the fail-safe speed change control (upshift). Thus, it is possible to appropriately discharge the counter electromotive force generated by the rotary electric machine (80) while suppressing continuation of a circulating current due to the active short circuit control (ASC) for a long time. In this way, with the present configuration, it is possible to appropriately execute the fail-safe control while suppressing an excessive increase in DC power source current (Ib) regenerated by the DC power source (11) or DC link voltage (Vdc) in the case where a failure has occurred in the rotary electric machine drive device (1) which includes the inverter (10) and suppressing continuation of a circulating current for a long time.

In the vehicle control device (50), preferably, in the fail-safe speed change control (upshift), the speed change device (90) is controlled in the direction of lowering the speed ratio to lower the rotational speed of the rotary electric machine (80) to the low rotational speed region. By lowering the rotational speed to the low rotational speed region in this way, the control scheme of the fail-safe control is caused to transition from the active short circuit control (ASC) to the shut-down control (SD). Thus, it is possible to suppress generation of large negative torque by the rotary electric machine (80), and to shorten the period for which the active short circuit control (ASC) is executed. In addition, heating of the rotary electric machine (80) due to continuation of a circulating current for a long time can also be suppressed. As a result, the possibility that the permanent magnet of the rotary electric machine (80) is overheated to be demagnetized is suppressed.

During execution of the shut-down control (SD), the rotational speed of the wheels (W) may be raised as the vehicle descends a slope or a step, for example, and such a rise in rotational speed may be transferred to the rotary electric machine (80) to raise the rotational speed of the rotary electric machine (80). When the rotational speed is raised to the high rotational speed region, the active short circuit control (ASC) is executed as the fail-safe control. When the fail-safe speed change control is executed, the rotational speed of the rotary electric machine (80) can be lowered, and execution of the active short circuit control (ASC) can be suppressed. In one aspect, preferably, the vehicle control device (50) controls the speed change device (90) in the direction of further lowering the speed ratio in the case where it is determined that the rotational speed of the rotary electric machine (80) is raised to the high rotational speed region during or after execution of the fail-safe speed change control.

In the case where the vehicle drive device (60) further includes the internal combustion engine (70) as a drive force source and power transfer between the internal combustion engine (70) and the wheels (W) is maintained, the wheels (W) can be rotated by the drive force of the internal combustion engine (70) even in a state in which the drive force of the rotary electric machine (80) is lost. In the case where the fail-safe control is executed, the passenger is notified of a fact that some failure has occurred in the vehicle or the vehicle drive device (60). In some cases, however, the passenger desires to move and stop the vehicle at a desired location such as a service area, for example. If the drive force of the internal combustion engine (70) is used in such cases, the rotational speed of the rotary electric machine (80) which is drivably coupled to the wheels (W) or the internal combustion engine (70) may be raised. In this event, as discussed above, if the speed change device (90) is controlled in the direction of further lowering the speed ratio, the vehicle can be advanced with the shut-down control (SD) maintained, for example. As a result, there is a higher possibility that the passenger can move the vehicle to the desired location.

In the active short circuit control (ASC), a current is circulated between the stator coils (8) and the inverter (20), and therefore much of the energy is consumed as heat in the stator coils (8) and the inverter (20). When the rotary electric machine (80) is heated by the heat, the permanent magnet which is provided in the rotary electric machine (80) may be overheated to be demagnetized. Therefore, it is necessary that the temperature of the rotary electric machine (80) should be suppressed within the range in which the magnetic force of the permanent magnet can be held. The rise in temperature is ascribable to the circulating current, and thus it is necessary that the current should be suppressed within an appropriate range. Conversely, if a rise in temperature of the rotary electric machine (80) due to execution of the active short circuit control (ASC) is allowable, the active short circuit control (ASC) can be continued without problem. In view of this point, a condition of the temperature of the rotary electric machine (80) can be added to the condition for executing the fail-safe speed change control. In one aspect, preferably, the fail-safe speed change control (upshift) is executed in the case where the active short circuit control (ASC) is executed as the fail-safe control and a temperature of the rotary electric machine (80) is equal to or more than a regulation temperature prescribed in advance. The regulation temperature is preferably set on the basis of various types of values obtained through an experiment or a simulation, specifically the time before a temperature at which the magnetic force of a permanent magnet is degraded is reached, the temperature rise per unit time, an error range of a temperature sensor, a current value, and so forth, as discussed above.

In the case where the inverter (80) is connected to the DC power source (11) via the power source switch (9) which blocks the supply of electric power in an off state, regenerative power charges the DC power source (11) when the power source switch (9) is in an on state. When the power source switch (9) is in an off state, the connection with the DC power source (11) is blocked, and therefore regenerative power raises the DC link voltage (Vdc). Therefore, the rotational speed of the rotary electric machine (80), which serves as a criterion for selecting the control scheme of the fail-safe control, is preferably set in accordance with the on/off state of the power source switch (9). That is, in one aspect, preferably, the inverter (10) is connected to the DC power source (11) via a power source switch (9) that blocks supply of electric power in an off state; and a maximum rotational speed ($\omega_{sd}$) at which execution of the shut-down control (SD) is allowed is set to a rotational speed at which a DC power source current (Ib) and regenerative power that match the rotational speed of the rotary electric machine (80) are less than allowable maximum rated values in accordance with a DC power source voltage in the case where the power source switch (9) is in an on state. In addition, preferably, the maximum rotational speed ($\omega_{sd}$) is set to a rotational speed at which a peak value of a counter electromotive force among lines for three phases is less than a maximum rated voltage allowed in the rotary electric machine drive device (1) in the case where the power source switch (9) is in an off state.

In the case where the DC power source voltage which is the voltage of the DC power source (11) has a lower limit value within the rated range, the potential difference from the voltage generated by the rotary electric machine (80) tends to become larger, and the DC power source current (Ib) and regenerative power also tend to become larger. Thus, as discussed above, preferably, in the case where the power source switch (9) is in an on state, the maximum rotational speed ($\omega_{sd}$) is set on the basis of the characteristics of the DC power source current (Ib) and regenerative power with respect to the rotational speed of the regenerative power (80) for a case where the DC power source voltage has a lower limit value within the rated range.

INDUSTRIAL APPLICABILITY

The technique according to the present disclosure can be utilized for an inverter control device that controls a rotary electric machine drive device that includes an inverter.

The invention claimed is:

1. An inverter control device that controls a electric machine drive device that includes an inverter with a plurality of switching elements, the inverter control device comprising:
an electronic control unit that is programmed to perform switching control on the switching elements and to execute fail-safe control when a failure has occurred in the rotary electric machine drive device, wherein:
the inverter is connected to a DC power source and connected to an AC rotary electric machine drivably coupled to wheels of a vehicle to perform electric power conversion between DC power and multi-phase AC power, the inverter including a series circuit including an upper switching element and a lower switching element that form an arm for one phase of the AC power, and the inverter including a freewheeling diode connected in parallel with each of the switching elements with a direction from a lower side toward an upper side defined as a forward direction;
active short circuit control and shut-down control, in which all the switching elements are brought into an off state, are selectively executed in the fail-safe control, the active short circuit control being either upper-side active short circuit control, in which the upper switching elements of the arms for all the multiple phases are brought into an on state, or lower-side active short circuit control, in which the lower switching elements of the arms for all the multiple phases are brought into an on state; and
the active short circuit control is executed in a high rotational speed region, and the shut-down control is executed in a low rotational speed region, which is on a low rotational speed side with respect to the high rotational speed region, in accordance with at least a rotational speed of the rotary electric machine.

2. The inverter control device according to claim 1, wherein
when the rotational speed of the rotary electric machine is raised to the high rotational speed region during execution of the shut-down control, a control scheme is caused to transition to the active short circuit control.

3. The inverter control device according to claim 1, wherein
when the rotational speed of the rotary electric machine is lowered to the low rotational speed region during execution of the active short circuit control, a control scheme is caused to transition to the shut-down control.

4. The inverter control device according to claim 1, wherein:

the inverter is connected to the DC power source via a power source switch that blocks supply of electric power in an off state; and a maximum rotational speed at which execution of the shut-down control is allowed is:

set to a rotational speed at which a DC power source current and regenerative power that match the rotational speed of the rotary electric machine are less than allowable maximum rated values in accordance with a DC power source voltage when the power source switch is in an on state, and set to a rotational speed at which a peak value of a counter electromotive force among lines for three phases is less than a maximum rated voltage allowed in the rotary electric machine drive device when the power source switch is in an off state.

5. The inverter control device according to claim 4, wherein when the power source switch is in an off state, the maximum rotational speed is further set such that a voltage of a smoothing capacitor that is raised by a charge supplied from the rotary electric machine during execution of the shut-down control is less than an allowable maximum value in accordance with a capacity of the smoothing capacitor, the smoothing capacitor being configured to smooth a DC link voltage which is a voltage on a DC side of the inverter.

6. The inverter control device according to claim 1, wherein a minimum rotational speed at which execution of the active short circuit control is allowed is set to a rotational speed at which an absolute value of negative torque transferred to the wheels during execution of the active short circuit control is less than an absolute value of maximum allowable negative torque prescribed in advance.

7. The inverter control device according to claim 1, wherein a minimum rotational speed at which execution of the active short circuit control is allowed is set to a rotational speed at which a phase current that flows during execution of the active short circuit control is less than a maximum value in a range of a current in which a magnetic force of a permanent magnet of the rotary electric machine can be held at a maximum temperature at which the rotary electric machine is operable.

8. An inverter control device that controls a rotary electric machine drive device that includes an inverter with a plurality of switching elements, the inverter control device comprising:

an electronic control unit that is programmed to perform switching control on the switching elements and to execute fail-safe control when a failure has occurred in the rotary electric machine drive device, wherein:

the inverter is connected to a DC power source and connected to an AC rotary electric machine drivably coupled to wheels of a vehicle to perform electric power conversion between DC power and multi-phase AC power, the inverter including a series circuit including an upper switching element and a lower switching element that form an arm for one phase of the AC power, and the inverter including a freewheeling diode connected in parallel with each of the switching elements with a direction from a lower side toward an upper side defined as a forward direction;

at least two modulation control schemes including pulse width modulation control and rectangular-wave control are selectively executed, the pulse width modulation control being a control scheme in which a plurality of pulses with different duties are output in one cycle of electrical angle, and the rectangular-wave control being a control scheme which is performed along with field weakening control, in which regulation is performed in a direction of weakening a field of the rotary electric machine, and in which one pulse is output in one cycle of electrical angle;

active short circuit control and shut-down control, in which all the switching elements are brought into an off state, are selectively executed in the fail-safe control, the active short circuit control being either upper-side active short circuit control, in which the upper switching elements of the arms for all the multiple phases are brought into an on state, or lower-side active short circuit control, in which the lower switching elements of the arms for all the multiple phases are brought into an on state; and the active short circuit control is executed when a failure has occurred in the rotary electric machine drive device during execution of the rectangular-wave control, and the shut-down control is executed when a failure has occurred in the rotary electric machine drive device during execution of the pulse width modulation control.

9. The inverter control device according to claim 8, wherein during execution of one of the active short circuit control and the shut-down control which has been selected in accordance with the modulation control scheme, the control scheme of the fail-safe control is caused to transition to the other of the active short circuit control and the shut-down control on the basis of a rotational speed of the rotary electric machine.

10. The inverter control device according to claim 9, wherein:

the inverter is connected to the DC power source via a power source switch that blocks supply of electric power in an off state;

when the rotational speed of the rotary electric machine is raised to be equal to or more than a maximum rotational speed at which execution of the shut-down control is allowed during execution of the shut-down control, the control scheme is caused to transition to the active short circuit control; and the maximum rotational speed is set to a rotational speed at which a DC power source current and regenerative power that match the rotational speed of the rotary electric machine are less than allowable maximum rated values in accordance with a DC power source voltage when the power source switch is in an on state, and set to a rotational speed at which a peak value of a counter electromotive force among lines for three phases is less than a maximum rated voltage allowed in the rotary electric machine drive device when the power source switch is in an off state.

11. The inverter control device according to claim 10, wherein when the power source switch is in an off state, the maximum rotational speed is further set such that a voltage of a smoothing capacitor that is raised by a charge supplied from the rotary electric machine during execution of the shut-down control is less than an allowable maximum value in accordance with a capacity of the smoothing capacitor, the smoothing capacitor being configured to smooth a DC link voltage which is a voltage on a DC side of the inverter.

12. The inverter control device according to claim 9, wherein when the rotational speed of the rotary electric machine is lowered to be equal to or less than a minimum rotational speed at which execution of the active short circuit control is allowed during execution of the active short circuit control, the control scheme is caused to transition to the shut-down control.

13. The inverter control device according to claim 10, wherein:

when the rotational speed of the rotary electric machine is lowered to be equal to or less than a minimum rotational speed at which execution of the active short circuit control is allowed during execution of the active short circuit control, the control scheme is caused to transition to the shut-down control; and the maximum rotational speed and the minimum rotational speed are set in accordance with a DC link voltage which is a voltage on a DC side of the inverter, and set to smaller values as the DC link voltage is lower.

14. The inverter control device according to claim 12, wherein the minimum rotational speed at which execution of the active short circuit control is allowed is set to a rotational speed at which an absolute value of negative torque transferred to the wheels during execution of the active short circuit control is less than an absolute value of maximum allowable negative torque prescribed in advance.

15. The inverter control device according to claim 12, wherein the minimum rotational speed at which execution of the active short circuit control is allowed is set to a rotational speed at which a phase current that flows during execution of the active short circuit control is less than a maximum value in a range of a current in which a magnetic force of a permanent magnet of the rotary electric machine can be held at a maximum temperature at which the rotary electric machine is operable.

16. A vehicle control device that controls a vehicle drive device and a rotary electric machine drive device and that includes the inverter control device according to claim 1, the vehicle drive device including a speed change device provided in a power transfer path that connects a rotary electric machine that serves as a drive force source for wheels of a vehicle and the wheels to each other, and the rotary electric machine drive device including the inverter, wherein:

the vehicle control device executes speed change control in which the speed change device is controlled by setting a speed ratio which is a ratio of a rotational speed of an input shaft of the speed change device to a rotational speed of an output shaft of the speed change device, inverter control in which switching elements which form the inverter are subjected to switching control, and fail-safe speed change control in which the speed change device is controlled in a direction of lowering the speed ratio when the active short circuit control is executed as the fail-safe control.

17. The vehicle control device according to claim 16, wherein in the fail-safe speed change control, the speed change device is controlled in the direction of lowering the speed ratio to lower a rotational speed of the rotary electric machine to the low rotational speed region.

18. The vehicle control device according to claim 16, wherein the speed change device is controlled in the direction of further lowering the speed ratio when it is determined that a rotational speed of the rotary electric machine is raised to the high rotational speed region during or after execution of the fail-safe speed change control.

19. The vehicle control device according to claim 16, wherein the fail-safe speed change control is executed when the active short circuit control is executed as the fail-safe control and a temperature of the rotary electric machine is equal to or more than a regulation temperature prescribed in advance.

20. The vehicle control device according to claim 16, wherein:

the inverter is connected to the DC power source via a power source switch that blocks supply of electric power in an off state;

a maximum rotational speed at which execution of the shut-down control is allowed is set to a rotational speed at which a DC power source current and regenerative power that match a rotational speed of the rotary electric machine are less than allowable maximum rated values in accordance with a DC power source voltage when the power source switch is in an on state, and set to a rotational speed at which a peak value of a counter electromotive force among lines for three phases is less than a maximum rated voltage allowed in the rotary electric machine drive device when the power source switch is in an off state.

* * * * *